(12) United States Patent
Simão et al.

(10) Patent No.: US 12,139,669 B2
(45) Date of Patent: Nov. 12, 2024

(54) EXHAUST GAS CONTROL VALVE

(71) Applicant: UNIFRAX I LLC, Tonawanda, NY (US)

(72) Inventors: Luiz Carlos Simão, Valinhos (BR); João Braha, Valinhos (BR); Magno Levi Araujo Mendes, São Bernardo do Campo (BR); Claudemir Costa, Vinhedo (BR); Raimundo De Souza, Vinhedo (BR)

(73) Assignee: UNIFRAX I LLC

( * ) Notice: Subject to any disclaimer, the term of this patent is extended or adjusted under 35 U.S.C. 154(b) by 122 days.

(21) Appl. No.: 17/598,459

(22) PCT Filed: Apr. 5, 2019

(86) PCT No.: PCT/BR2019/050126
§ 371 (c)(1),
(2) Date: Sep. 27, 2021

(87) PCT Pub. No.: WO2020/198820
PCT Pub. Date: Oct. 8, 2020

(65) Prior Publication Data
US 2022/0177783 A1 Jun. 9, 2022

(51) Int. Cl.
*F16K 5/04* (2006.01)
*C10B 27/06* (2006.01)
(Continued)

(52) U.S. Cl.
CPC ............ *C10B 27/06* (2013.01); *F16K 5/0407* (2013.01); *F16K 25/005* (2013.01); *F16K 27/065* (2013.01)

(58) Field of Classification Search
CPC ...... C10B 27/06; F16K 5/0407; F16K 27/065
See application file for complete search history.

(56) References Cited

U.S. PATENT DOCUMENTS

| 2,624,658 A | 1/1953 | Parker et al. |
| 4,269,391 A | 5/1981 | Saito et al. |

(Continued)

FOREIGN PATENT DOCUMENTS

| CN | 102686302 A | 9/2012 |
| CN | 102803883 A | 11/2012 |

(Continued)

OTHER PUBLICATIONS

International Search Report and Written Opinion of the International Search Authority issued by the U.S. Patent and Trademark Office for International Application No. PCT/BR2019/050126, mailed Sep. 18, 2019, 8 pages.

(Continued)

*Primary Examiner* — Matthew W Jellett
*Assistant Examiner* — Christopher D Ballman
(74) *Attorney, Agent, or Firm* — Haynes and Boone, LLP; Randall C. Brown; Michael J. Tobin

(57) ABSTRACT

A valve including a housing, a rotating member positioned within the housing, and an actuator engaged with the rotating member. The rotating member has a generally cylindrical form and a cavity extending through a portion of the generally cylindrical form in a direction generally perpendicular to an axis of the generally cylindrical form. The rotating member is positioned within the housing such that, during operation of the valve, the actuator rotates the rotating member within the housing about the axis of the generally cylindrical form, and upon completion of about 90° of rotation of the rotating member about the axis, the cavity becomes aligned within the housing to change the valve from an open condition to a closed condition, or vice versa. The rotating member includes inorganic fibers and a binder. Methods of making and using the valve are also contemplated.

16 Claims, 23 Drawing Sheets

(51) Int. Cl.
*F16K 25/00* (2006.01)
*F16K 27/06* (2006.01)

(56) References Cited

U.S. PATENT DOCUMENTS

| | | | |
|---|---|---|---|
| 5,332,699 | A | 7/1994 | Olds et al. |
| 5,585,312 | A | 12/1996 | TenEyck et al. |
| 5,599,867 | A | 2/1997 | Ito et al. |
| 5,714,421 | A | 2/1998 | Olds et al. |
| 5,811,360 | A | 9/1998 | Jubb |
| 5,821,183 | A | 10/1998 | Jubb |
| 5,874,375 | A | 2/1999 | Zoitos et al. |
| 5,928,476 | A * | 7/1999 | Daniels ............... C10B 9/00 201/35 |
| 5,928,975 | A | 7/1999 | Jubb |
| 5,955,389 | A | 9/1999 | Jubb |
| 6,025,288 | A | 2/2000 | Zoitos et al. |
| 6,030,910 | A | 2/2000 | Zoitos et al. |
| 6,187,148 | B1 | 2/2001 | Sturgulewski |
| 6,861,381 | B1 | 3/2005 | Jubb et al. |
| 6,953,757 | B2 | 10/2005 | Zoitos et al. |
| 7,153,796 | B2 | 12/2006 | Jubb et al. |
| 7,259,118 | B2 | 8/2007 | Jubb et al. |
| 8,220,488 | B2 * | 7/2012 | McCully ............... F16K 11/085 137/614.16 |
| 8,360,103 | B2 * | 1/2013 | Pollack ............... F16K 27/0218 137/614.01 |
| 8,839,817 | B2 * | 9/2014 | Dederich ............. F16K 5/0442 251/249.5 |
| 9,523,434 | B2 * | 12/2016 | Nagahama ........... F16K 5/0471 |
| 9,897,223 | B1 * | 2/2018 | Roberts ............... F16K 25/00 |
| 10,012,317 | B2 * | 7/2018 | Sucher ................ F16K 5/0207 |
| 10,955,066 | B2 * | 3/2021 | Lah ..................... F16K 5/045 |
| 2009/0065724 | A1 | 3/2009 | Mitton et al. |
| 2015/0004020 | A1 | 1/2015 | Lombard et al. |
| 2015/0315870 | A1 * | 11/2015 | Kalb ..................... F16K 5/0657 166/330 |
| 2017/0175487 | A1 | 6/2017 | Marcin et al. |
| 2018/0073654 | A1 * | 3/2018 | Nowell ................. F16K 27/065 |
| 2018/0266573 | A1 * | 9/2018 | Nowell ................. F16K 5/0478 |
| 2022/0177783 | A1 | 6/2022 | Simão et al. |

FOREIGN PATENT DOCUMENTS

| | | |
|---|---|---|
| CN | 105889544 A | 8/2016 |
| CN | 106147803 A | 11/2016 |
| DE | 202013101269 U1 | 4/2014 |
| EP | 0973697 B1 | 7/2000 |
| EP | 2 993 240 A1 | 3/2016 |
| GB | 1073693 A | 6/1967 |
| IN | 02473/KOLNP/2005 A | 10/2006 |
| WO | WO 2011/159914 A2 | 12/2011 |
| WO | WO 2014/042622 A1 | 3/2014 |
| WO | WO 2018/196977 A1 | 11/2019 |

OTHER PUBLICATIONS

Extended European Search Report issued in European Patent Application No. 19922497.3, dated Oct. 26, 2022, (7 pgs.).
First Chinese Office Action and Search Report for Chinese Patent Application No. 201980097139.3 issued by the China National Intellectual Property Administration, dated Nov. 27, 2023 (10 pgs.).
English translation of First Chinese Office Action for Chinese Patent Application No. 201980097139.3 issued by the China National Intellectual Property Administration, dated Nov. 27, 2023 (7 pgs.).
English translation of Search Report for Chinese Patent Application No. 201980097139.3 issued by the China National Intellectual Property Administration, dated Nov. 27, 2023 (3 pgs.).
Notification To Grant Patent Right for Invention for Chinese Patent Application No. 201980097139.3 issued by the China National Intellectual Property Administration, dated Sep. 6, 2024. (4 pgs.).
English Translation of Notification To Grant Patent Right for Invention for Chinese Patent Application No. 201980097139.3 issued by the China National Intellectual Property Administration, dated Sep. 6, 2024. (2 pgs.).

* cited by examiner

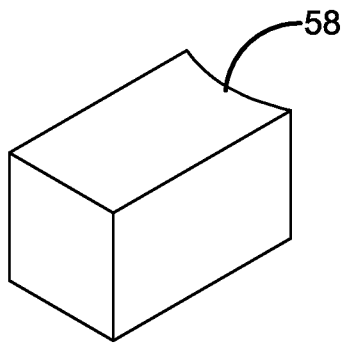
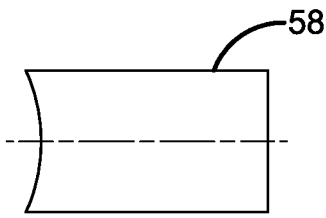
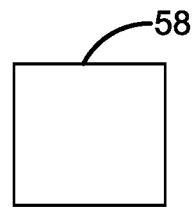
FIG. 14A  FIG. 14B  FIG. 14C
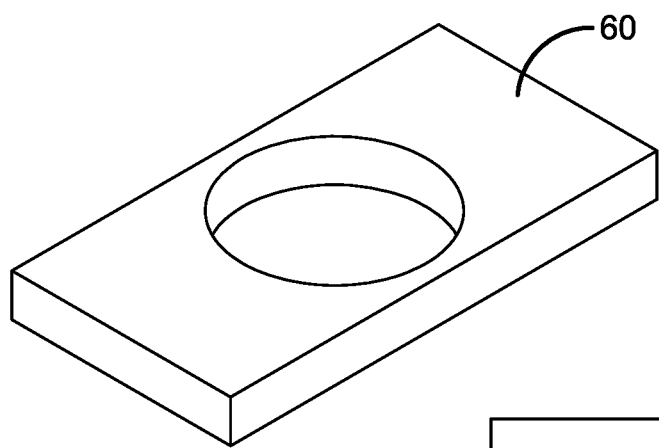
FIG. 15A
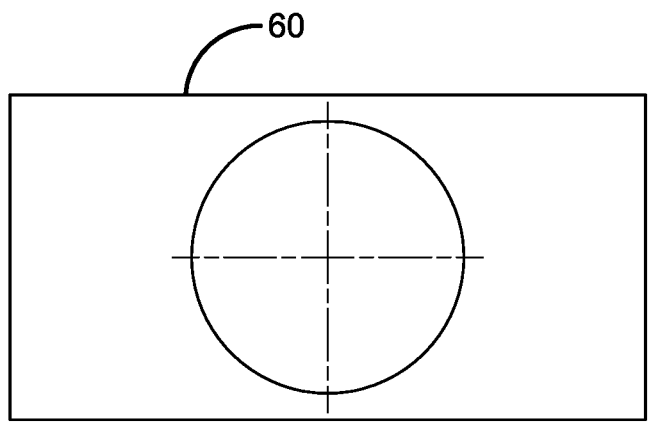
FIG. 15B
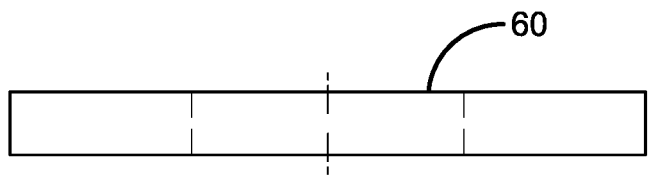
FIG. 15C

EXHAUST GAS CONTROL VALVE

CROSS-REFERENCE TO RELATED APPLICATIONS

This application is a U.S. National Stage patent application of International Patent Application No. PCT/BR2019/050126 filed on Apr. 5, 2019, the entire disclosure of which is incorporated herein by reference in its entirety.

FIELD OF THE DISCLOSURE

Provided is an exhaust gas control valve made from high temperature resistant material(s), which may be used in exhaust systems, such as hot gas exhaust systems, as well as associated methods of making and using the exhaust gas control valve, and systems using the exhaust gas control valve.

One example of a system which produces hot exhaust gases is a coke oven. Coke ovens are used to transform mineral-grade coal into metallurgical-grade coal by means of thermal treatment, which may be used in manufacturing steel or other metal alloys. A coke oven may comprise a number of coke oven chambers. Each chamber may have a single ascension duct which transports exhaust gas from the chamber to a central duct, which links numerous ascension ducts together to transport the hot exhaust gases to a facility which may utilize the hot exhaust gas, such as a gas turbine used to generate power. The exhaust gases may also be processed to extract desirable components of the exhaust gas into useful industrial gases.

BACKGROUND

During the thermal process used to treat the coal, large amounts of gas are generated. These gases come from the mineral-grade coal itself and also from the burners that are used to heat the coke oven chambers. During operation of the coke oven system, one chamber may be open to charge or discharge coal from the chamber, and other chambers may be closed and heating up, for example. Because of this, flux control is required in the ascension duct in order to regulate the internal pressure of an individual chamber, and also to avoid any drag of cold air once a chamber is opened.

Conventionally, a damper, which may comprise a refractory board, may be used to achieve this flux control. These systems are only partially effective, however, because the damper experiences strong thermal stresses which may cause the damper to fail over time. The damper is also a heavy piece which requires a cumbersome control system that increases the complexity of the furnace operation. Frequent failures will result in system downtime to replace the damper.

Inadequacies or failures of these conventional systems may cause temperature excursions which may harm the coke oven itself. Excess heating may impact the overall life of a particular chamber, or even the entire coke oven, because it can cause superheating of the metallic structure of the cold face of the furnace. As the metallic parts of the coke oven are superheated, they may bend and cause refractory failure in the hot face, which in turn results in even higher cold face temperatures, resulting in a potentially catastrophic failure of the metallic materials.

What is needed is a more robust means of achieving the required flux control. Therefore, provided herein is an exhaust gas control valve which contributes to maintaining process control in a coke oven operation, and may also simplify process control. Better process control provides for a higher degree of control over the resulting metallurgical-grade coal, such as by allowing for better control of residence time in a coke oven, maintaining appropriate pressure inside the individual chambers, reducing heat loss in the system, and improving the quality of the exhaust gases. Better flux control may also increase the life of the individual chambers or the entire system, by reducing or eliminating superheating of the metallic parts of the coke oven.

BRIEF DESCRIPTION OF THE DRAWINGS

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

FIGS. 14A-C are various views of a part which may be used to form a housing of a valve according to the present subject matter, as described in more detail below.

FIGS. 15A-C are various views of a part which may be used to form a housing of a valve according to the present subject matter, as described in more detail below.

DETAILED DESCRIPTION

Figure 1:
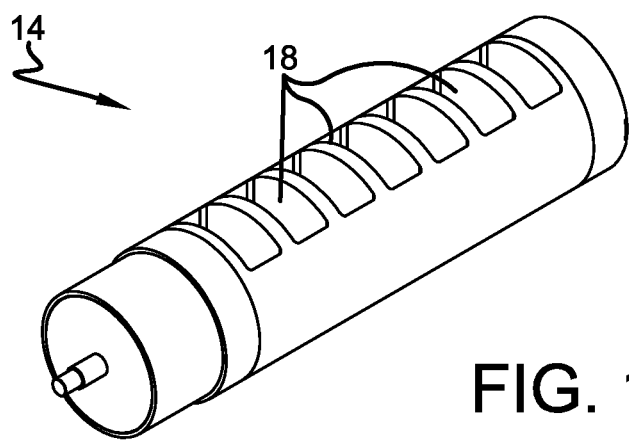
FIG. 1 is a perspective view of an illustrative rotating member for a valve according to the present subject matter.

The following embodiments of the present subject matter are contemplated:

A valve is disclosed herein including:

a housing;

a rotating member positioned within the housing; and an actuator engaged with the rotating member;

wherein the rotating member has a generally cylindrical form and at least one cavity extending through a portion of the generally cylindrical form in a direction generally perpendicular to an axis of the generally cylindrical form;

wherein the rotating member is positioned within the housing such that, during operation of the valve, the actuator rotates the rotating member within the housing about the axis of the generally cylindrical form, and upon completion of about 90° of rotation of the rotating member about the axis, the at least one cavity becomes aligned within the housing to change the valve from an open condition to a closed condition, or from a closed condition to an open condition;

and wherein the rotating member includes inorganic fibers and at least one binder.

The valve may include the following features:

wherein the rotating member includes more than one of the at least one cavity;

wherein the rotating member includes a hollow axial void centered around the axis of the generally cylindrical form and extending through greater than 50 percent of the length of the generally cylindrical form.

wherein the rotating member further includes at least one colloidal inorganic oxide;

wherein the colloidal inorganic oxide includes at least one of colloidal silica, colloidal alumina, colloidal zirconia, colloidal titania, colloidal ceria, or colloidal yttria; optionally wherein the colloidal inorganic oxide includes at least one gelling agent; optionally wherein the at least one gelling agent includes: (i) at least one of at least one inorganic salt or at least one inorganic oxide; and (ii) at least one acid; wherein the at least one inorganic salt includes at least one of ammonium acetate, calcium chloride, or magnesium chloride; wherein the at least one inorganic oxide includes magnesium oxide; and wherein the at least one acid includes at least one of acetic acid, hydrochloric acid, or phosphoric acid;

wherein the inorganic fibers include at least one of low biopersistent fibers, refractory ceramic fibers, glass fibers, leached silica fibers, high alumina fibers, mullite fibers, rock wool fibers, slag wool fibers, alumina/silica fibers, magnesium aluminosilicate fibers. S-2 glass fibers, or E-glass fibers;

wherein the at least one binder includes at least one of: (a) at least one inorganic binder; or (b) at least one organic binder;

wherein the at least one binder includes at least one inorganic binder;

wherein the at least one binder includes at least one inorganic binder and at least one organic binder;

wherein the at least one inorganic binder includes at least one of colloidal silica, colloidal alumina, colloidal zirconia or clay;

wherein the organic binder includes at least one of polymer emulsions, solvent-based polymers or solvent-free polymers;

wherein the polymer emulsions include a latex;

wherein the latex includes at least one of natural rubber latexes, styrene-butadiene latexes, butadiene-acrylonitrile latexes, or latexes of acrylate/methacrylate polymers/copolymers;

wherein the solvent-based polymers include at least one of acrylics, polyurethanes, vinyl acetate, celluloses, or rubber-based organic polymers;

wherein the solvent-free polymers include at least one of natural rubber, styrene-butadiene rubber, or other elastomers;

wherein the at least one organic binder includes at least one starch;

wherein the starch includes at least one of potato starch or corn starch;

wherein the at least one organic binder includes at least one phenolic binder;

wherein the at least one organic binder includes at least one type of polymeric binder fibers;

wherein the polymeric binder fibers include at least one of polyvinyl alcohol fibers, polyolefin fibers such as polyethylene and polypropylene, acrylic fibers, polyester fibers, ethyl vinyl acetate fibers, or nylon fibers;

the inorganic fibers are present in the rotating member in an amount of from about 30 to about 90 percent by weight, based on the dry weight of the rotating member;

wherein the at least one binder is present in the rotating member in an amount of from about 20 to about 70 percent by weight, based on the dry weight of the rotating member;

wherein the colloidal inorganic oxide is present in the rotating member in an amount of from about 40 to about 80 percent by weight, based on the dry weight of the rotating member;

wherein the rotating member further includes at least one filler;

wherein the at least one filler includes at least one of tabular alumina, calcined alumina, hydrated alumina, at least one other high alumina material, at least one clay, zirconia, spinel, silica, magnesia, calcia, mullite, silicon carbide, or silicon nitride;

wherein the at least one filler is present in the rotating member in an amount of from about 5 to about 75 percent by weight, based on the dry weight of the rotating member;

wherein the rotating member is able to withstand temperatures of at least about 1.000° C.;

wherein the rotating member has a density of at least about 400 kg/m$^3$;

wherein the rotating member has a thermal conductivity of equal to or less than about 0.45 W/m-K at a temperature of from about 700° C. to about 800° C.;

wherein the rotating member shrinks by no more than about 5% at a temperature of about 1.000° C. and/or wherein the rotating member shrinks by no more than about 10% at a temperature of about 1.500° C.;

wherein the rotating member has a compressive resistance of at least about 50 kg/cm²;

wherein the rotating member further includes at least one coating material applied to at least a portion of an exterior surface of the rotating member;

wherein the coating material includes inorganic fibers and at least one binder;

wherein the coating material includes inorganic fibers, at least one binder, and at least one silica-containing compound;

wherein the coating material includes inorganic fibers, at least one organic binder, at least one inorganic binder, and at least one silica-containing compound;

the coating material includes low biopersistent inorganic fibers;

wherein the coating material includes a gelling agent;

wherein the coating material includes a thickening agent;

wherein the coating material includes at least one colloidal inorganic oxide;

wherein the housing includes inorganic fibers and at least one binder;

wherein the housing further includes at least one colloidal inorganic oxide;

wherein the colloidal inorganic oxide includes at least one of colloidal silica, colloidal alumina, colloidal zirconia, colloidal titania, colloidal ceria, or colloidal yttria; optionally wherein the colloidal inorganic oxide includes at least one gelling agent; optionally wherein the at least one gelling agent includes: (i) at least one of at least one inorganic salt or at least one inorganic oxide; and (ii) at least one acid; wherein the at least one inorganic salt includes at least one of ammonium acetate, calcium chloride, or magnesium chloride; wherein the at least one inorganic oxide includes magnesium oxide; and wherein the at least one acid includes at least one of acetic acid, hydrochloric acid, or phosphoric acid; wherein the inorganic fibers include at least one of low biopersistent fibers, refractory ceramic fibers, glass fibers, leached silica fibers, high alumina fibers, mullite fibers, rock wool fibers, slag wool fibers, alumina/silica fibers, magnesium aluminosilicate fibers. S-2 glass fibers, or E-glass fibers;

wherein the at least one binder includes at least one of: (a) at least one inorganic binder; or (b) at least one organic binder;

wherein the at least one binder includes at least one inorganic binder;

wherein the at least one binder includes at least one inorganic binder and at least one organic binder;

wherein the at least one inorganic binder includes at least one of colloidal silica, colloidal alumina, colloidal zirconia or clay;

wherein the organic binder includes at least one of polymer emulsions, solvent-based polymers or solvent-free polymers.

wherein the polymer emulsions include a latex;

wherein the latex includes at least one of natural rubber latexes, styrene-butadiene latexes, butadiene-acrylonitrile latexes, or latexes of acrylate/methacrylate polymers/copolymers;

wherein the solvent-based polymers include at least one of acrylics, polyurethanes, vinyl acetate, celluloses, or rubber-based organic polymers;

wherein the solvent-free polymers include at least one of natural rubber, styrene-butadiene rubber, or other elastomers;

wherein the at least one organic binder includes at least one starch;

wherein the starch includes at least one of potato starch or corn starch;

wherein the at least one organic binder includes at least one phenolic binder;

wherein the at least one organic binder includes at least one type of polymeric binder fibers;

wherein the polymeric binder fibers include at least one of polyvinyl alcohol fibers, polyolefin fibers such as polyethylene and polypropylene, acrylic fibers, polyester fibers, ethyl vinyl acetate fibers, or nylon fibers;

wherein the inorganic fibers are present in the housing in an amount of from about 30 to about 90 percent by weight, based on the dry weight of the housing;

wherein the at least one binder is present in the housing in an amount of from about 20 to about 70 percent by weight, based on the dry weight of the housing;

wherein the colloidal inorganic oxide is present in the housing in an amount of from about 40 to about 80 percent by weight, based on the dry weight of the housing;

wherein the housing further includes at least one filler;

wherein the at least one filler includes at least one of tabular alumina, calcined alumina, hydrated alumina, at least one other high alumina material, at least one clay, zirconia, spinel, silica, magnesia, calcia, mullite, silicon carbide, or silicon nitride;

wherein the at least one filler is present in the housing in an amount of from about 5 to about 75 percent by weight, based on the dry weight of the housing;

wherein the housing is able to withstand temperatures of at least about 1.000° C.;

wherein the housing has a density of at least about 400 kg/m³;

wherein the housing has a thermal conductivity of equal to or less than about 0.45 W/m·K at a temperature of from about 700° C. to about 800° C.;

wherein the housing shrinks by no more than about 5% at a temperature of about 1.000° C. and/or wherein the housing shrinks by no more than about 10% at a temperature of about 1.500° C.; and/or wherein the housing has a compressive resistance of at least about 50 kg/cm².

An exhaust apparatus is disclosed herein including the valve according to embodiments of the present disclosure.

A coke oven system is disclosed herein including at least one exhaust apparatus according to embodiments of the present disclosure.

A method of manufacturing a rotating member for a valve is disclosed herein. The method includes:

preparing an aqueous slurry including inorganic fibers and at least one binder;

contacting the aqueous slurry with a mold having a shape substantially similar to the shape of the rotating member;

vacuum casting the slurry into and/or onto the mold to form a green shape; and drying the green shape to form a dried shape which forms the rotating member.

A method of manufacturing a rotating member for a valve is disclosed herein. The method includes:

preparing an aqueous slurry including inorganic fibers and at least one binder;

contacting the aqueous slurry with a mold having a generally cylindrical shape;

vacuum casting the slurry into and/or onto the mold to form a green shape;

drying the green shape to form a dried shape; and removing material from the dried shape to form the rotating member.

A method of manufacturing a rotating member for a valve is disclosed herein. The method includes:

preparing an aqueous slurry including inorganic fibers and at least one binder;

contacting the aqueous slurry with a plurality of molds;

vacuum casting the slurry into and/or onto the molds to form a plurality of green shapes;

drying the green shapes to form a plurality of dried shapes;

optionally removing material from at least one of the dried shapes to form at least one refined shape; and assembling the dried shapes and/or the refined shape(s) to form the rotating member.

The method of manufacturing may include:

wherein, prior to said drying, the green shape(s) is refined;

wherein after said drying, the dried shape(s) is impregnated with colloidal silica;

wherein said impregnation is accomplished by soaking the dried shape(s) in a colloidal silica bath;

wherein at least a portion of an exterior surface of the rotating member is coated with a coating material.

A rotating member manufactured according to embodiments of the present disclosure is disclosed herein.

A valve is disclosed herein including a housing and a rotating member according embodiments of the present disclosure.

An exhaust apparatus is disclosed herein including the valve according to embodiments of the present disclosure.

A coke oven system including at least one exhaust apparatus according to embodiments of the present disclosure is disclosed herein.

A method of retrofitting an exhaust system for a coke oven is disclosed herein. The method includes:

removing a portion of the exhaust system to accommodate the valve of embodiments of the present disclosure; and placing the valve into the removed portion of the exhaust system to form a retrofitted exhaust system.

A method of retrofitting an exhaust system for a coke oven, wherein the exhaust system includes an angled portion and a vertical portion, the method comprising:

removing the angled portion;

modifying the angled portion to form a modified angled portion such that the modified angled portion accommodates the valve according to embodiments of the present disclosure;

placing the valve into the exhaust system in contact with the vertical portion; and placing the modified angled portion adjacent to the valve to form a retrofitted exhaust system.

A method of retrofitting an exhaust system for a coke oven is disclosed herein, wherein the exhaust system includes an angled portion and a vertical portion. The method including:

removing the angled portion;

modifying the angled portion to form a modified angled portion, and modifying the vertical portion to form a modified vertical portion, such that, together, the modified angled portion and modified vertical portion accommodate the valve according to embodiments of the present disclosure;

placing the valve into the exhaust system such that the valve occupies a space created via said modifying the vertical portion; and placing the modified angled portion in contact with the valve to form a retrofitted exhaust system.

Unless context clearly dictates otherwise, as used herein, the term "substantially" refers to a degree of deviation that is sufficiently small so as to not measurably detract from the identified property or circumstance. The exact degree of deviation allowable may in some cases depend on the specific context.

One of ordinary skill in the art would understand the term "about" is used herein to mean that an amount of "about" of a recited value results in the desired degree of effectiveness in the compositions, products, systems and/or methods of the present disclosure. One of ordinary skill in the art would further understand that the metes and bounds of the term "about" with respect to the value of a percentage, amount or quantity of any component in an embodiment can be determined by varying the value, determining the effectiveness of the compositions, products, systems and/or methods for each value, and determining the range of values that produce compositions with the desired degree of effectiveness in accordance with the present disclosure. For example, the term "about" includes at least the degree of error associated with the measurement of the particular value. The term "about" is further used to reflect the possibility that a composition may contain trace components of other materials that do not alter the effectiveness of the composition. For example, in the phrase "upon completion of about 90° of rotation of the rotating member about the axis, the at least one cavity becomes aligned within the housing to change the valve from an open condition to a closed condition". "about 90°" means that the rotation may be more or less than 90°, so long as the rotation still results in an open condition or a closed condition as described herein.

When a range of values is described in the present disclosure, it is intended that any and every value within the range, including the end points, is to be considered as having been explicitly disclosed. For example, a ratio in "a range of from about 1:1 to about 20:1" is to be read as indicating each and every possible ratio between 1:1 and 20:1. Similarly, a compositional range of "about 40 to about 60 weight percent amorphous silica" is to be read as indicating each and every possible value within 40 and 60, including the end points. It is to be understood that the inventors appreciate and understand that any and all values within a range of values are to be considered to have been specified, and that the inventors have possession of the entire range and all the values within the range.

As used herein, the phrase "at least one" means one or more than one. However, it is also intended that the indefinite article "a" or "an" may also mean one or more than one, unless the context clearly dictates otherwise.

As used herein, the phrase "at least one of" means that any one or any combination of more than one of the listed items or materials may be included within the meaning of the phrase. For example, "wherein X comprises at least one of A, B, C, or D" means that X comprises any single one of A, B, C or D. or any combination of two or more of A, B, C and D.

Compositional weight percentages disclosed herein are based on the total weight of the composition being described. It will be understood to one of ordinary skill in the art that the total weight percent cannot exceed 100%. For example, a person of ordinary skill in the art would easily recognize and understand that a composition comprising 65 to 86 weight percent component A, 14 to 35 weight percent component B, 0.1 to 5 weight percent component C. and 0.1 to 2 weight percent component D 40) will not exceed 100%. A person of ordinary skill in the art would understand that the amounts of one or more of the components will be adjusted to include the desired amount of each component without exceeding 100% by weight of the composition.

Provided is a valve comprising: a housing; a rotating member positioned within the housing; and an actuator engaged with the rotating member; wherein the rotating member has a generally cylindrical form and at least one cavity extending through a portion of the generally cylindrical form in a direction generally perpendicular to an axis of the generally cylindrical form; wherein the rotating member is positioned within the housing such that, during operation of the valve, the actuator rotates the rotating member within the housing about the axis of the generally cylindrical form, and upon completion of about 90° of rotation of the rotating member about the axis, the at least one cavity becomes aligned within the housing to change the valve from an open condition to a closed condition, or from a closed condition to an open condition; and wherein the rotating member comprises inorganic fibers and at least one binder.

As used herein, the phrase "generally cylindrical form" refers to a three-dimensional shape which is bounded by a substantially right circular cylindrical surface as its major surface, and which may include voids within the boundary defining the major surface. Without limitation, solid right circular cylinders and solid right circular cylinders with hollow axial centers (e.g . . . tubes) are both to be considered bounded by a substantially right circular cylindrical surface. The ends of such three-dimensional shapes, being the minor surfaces, may be flat (as in the bases of a solid cylinder), or may be non-flat, such as rounded, as needed and/or preferred for a particular application.

As used herein, an "axis" of such a generally cylindrical form refers to a line which passes substantially through the center of each imaginary base of the generally cylindrical form; referring to the bases of the generally cylindrical form as "imaginary" indicates that the ends of the generally cylindrical form are not necessarily flat.

As used herein, the phrase "generally perpendicular to an axis of the generally cylindrical form", as this phrase relates to the at least one cavity, indicates that the at least one cavity is a three-dimensional void in the rotating member which includes a plane which is perpendicular to the axis, and other planes which are parallel to the plane which is perpendicular to the axis.

As used herein, the phrase "open condition" refers to a condition of the valve which is fully open or so close to fully open that the difference in flow through the valve as compared to fully open does not significantly alter flow through the valve. As used herein, the phrase "closed condition" refers to a condition of the valve which is fully closed or so close to fully closed that the amount of flow through the valve is negligible. As used herein, the phrase "partially open condition" refers to a condition of the valve which is not the "open condition" or the "closed condition".

In certain embodiments, the rotating member may comprise more than one of the at least one cavity. In certain embodiments, the rotating member may comprise a hollow axial void centered around the axis of the generally cylindrical form and extending through greater than 50 percent of the length of the generally cylindrical form.

In certain embodiments, the rotating member may further comprise at least one colloidal inorganic oxide The colloidal inorganic oxide may comprise at least one of colloidal silica, colloidal alumina, colloidal zirconia, colloidal titania, colloidal ceria, or colloidal yttria The colloidal inorganic oxide may comprise at least one gelling agent, such as: (i) at least one of at least one inorganic salt or at least one inorganic oxide; and (ii) at least one acid. The at least one inorganic salt may comprise at least one of ammonium acetate, calcium chloride, or magnesium chloride. The at least one inorganic oxide may comprise magnesium oxide. The at least one acid may comprise at least one of acetic acid, hydrochloric acid, or phosphoric acid.

The colloidal inorganic oxide solution compositions that may be used in the rotating member may contain at least one colloidal inorganic oxide, such as colloidal silica, alumina, zirconia, titania, ceria, and/or yttria. (In this context, the terms "solution" is intended to include slurries or dispersions containing the colloidal inorganic oxides.) Commercially available formulations of the colloidal inorganic oxide may be utilized, by way of illustration and not limitation. NALCO colloidal silica comprising 40% solids, available from Nalco Company (Naperville. Illinois). However, other grades of colloidal silica may also be used, such as 30% solids content or less, or alternatively greater than 40% solids content.

The colloidal inorganic oxide solution composition may comprise about 30 to 100% by weight colloidal inorganic oxide. In certain embodiments, the colloidal inorganic oxide solution may comprise about 50 to about 90% colloidal inorganic oxide, and in other embodiments, about 80 to 100% colloidal inorganic oxide.

Other components of the colloidal inorganic oxide solution may include a gelling agent and water in an amount sufficient to solubilize the gelling agent. Gelling agent components may include inorganic salts or oxides that promote the setting or gelling of the colloidal inorganic oxide, for example in the case of colloidal silica, such as ammonium acetate, calcium chloride, magnesium chloride, magnesium oxide, and the like, and an acid, such as acetic acid, hydrochloric acid, phosphoric acid, and the like. The type and concentration of gelling agents are selected to destabilize the colloidal suspension, and to permit the gel or set of the inorganic oxide component in place during pressing of the high temperature resistant fiber blanket or board.

Gel time can be controlled, in part, by the concentration of the gelling agent, as the gelling time generally decreases with an increase in temperature. The amount of inorganic salt or oxide gelling agent may vary from about 0.01 to about 10% by weight of the solution. The amount of acid may vary from about 0.01 to about 10% by weight. The amount of water sufficient to solubilize the gelling agent may vary from 0) to about 70% of the solution.

The colloidal inorganic oxide solution may additionally comprise a colorant, in some embodiments, in an amount of about 0.01% to about 10% by weight, such as to enable the end product to be distinguished by color.

In certain embodiments, the inorganic fibers comprise at least one of low biopersistence fibers, refractory ceramic fibers, glass fibers, leached silica fibers, high alumina fibers, mullite fibers, rock wool fibers, slag wool fibers, alumina/silica fibers, magnesium aluminosilicate fibers. S-2 glass fibers, or E-glass fibers.

An illustrative example of the low biopersistence fibers includes, but is not limited to, ISOFRAX® alkaline earth silicate (AES) fibers, available from Unifrax I LLC. Tonawanda. New York, having an average diameter of between about 0.6 microns and about 2.6 microns.

An illustrative example of the refractory ceramic micro fibers include, but is not limited to, FIBERFRAX® refractory aluminosilicate ceramic fibers (RCF), available from Unifrax I LLC, Tonawanda, New York.

Additionally, borosilicate and high silica content fibers capable of resisting 1100° C. temperatures without loss of structural integrity may also be used.

The term "low biopersistence" fibers refers to fibers that are decomposable in a physiological medium or in a simulated physiological medium such as simulated lung fluid. The solubility of the fibers may be evaluated by measuring the solubility of the fibers in a simulated physiological medium over time. A method for measuring the biopersistence (i.e., the non-durability) of the fibers in physiological media is disclosed U.S. Pat. No. 5,874,375 assigned to Unifrax I LLC, although other methods are also suitable for evaluating the biopersistence of inorganic fibers.

Without limitation, suitable examples of low biopersistence inorganic fibers that can be used include those low biopersistence inorganic fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,975, 5,821,183, and 5,811,360.

The low biopersistence alkaline earth silicate fibers may comprise the fiberization product of a mixture of oxides of magnesium and silica, commonly referred to as magnesium-silicate fibers. The magnesium-silicate fibers generally comprise the fiberization product of about 60 to about 90 weight percent silica, from greater than 0) to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Tonawanda. New York) under the registered trademark ISOFRAXR. Commercially available ISOFRAX® fibers generally comprise the fiberization product of about 70 to about 80 weight percent silica, about 18 to about 27 weight percent magnesia and 4 weight percent or less impurities.

Alternatively or additionally, the low biopersistence alkaline earth silicate fibers may comprise the fiberization product of a mixture of oxides of calcium, magnesium and silica. These fibers are commonly referred to as calcia-magnesia-silicate fibers. The calcia-magnesia-silicate fibers generally comprise the fiberization product of about 45 to about 90 weight percent silica, from greater than 0) to about 45 weight percent calcia, from greater than 0) to about 35 weight percent magnesia, and 10 weight percent or less impurities. Suitable calcia-magnesia-silicate fibers are commercially available from Unifrax I LLC (Tonawanda. New York) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia. Other commercially available calcia-magnesia-silicate fibers comprise about 60 to about 70 weight percent silica, from about 25 to about 35 weight percent calcia, from about 4 to about 7 weight percent magnesia, and trace amounts of alumina; or, about 60 to about 70 weight percent silica, from about 16 to about 22 weight percent calcia, from about 12 to about 19 weight percent magnesia, and trace amounts of alumina.

Refractory ceramic fiber (RCF) typically comprises alumina and silica. A suitable alumino-silicate ceramic fiber is commercially available from Unifrax I LLC (Tonawanda. New York) under the registered trademark FIBERFRAX. The FIBERFRAX® ceramic fibers comprise the fiberization product of a melt comprising from about 45 to about 75 weight percent alumina and from about 25 to about 55 weight percent silica. The FIBERFRAX® fibers exhibit operating temperatures of up to about 1540° C. and a melting point up to about 1870° C. In certain embodiments, the alumino-silicate fiber may comprise from about 40 weight percent to about 60 weight percent $Al_2O_3$ and from about 60 weight percent to about 40 weight percent $SiO_2$, and in some embodiments, from about 47 to about 53 weight percent alumina and from about 47 to about 53 weight percent silica.

The RCF fibers are a fiberization product that may be blown or spun from a melt of the component materials. RCF may additionally comprise the fiberization product of alumina, silica and zirconia, in certain embodiments in the amounts of from about 29 to about 31 percent by weight alumina, from about 53 to about 55 percent by weight silica, and from about 15 to about 17 weight percent zirconia. RCF fiber length is in certain embodiments, in the range of from about 3 mm to 6.5 mm, typically less than about 5 mm, and the average fiber diameter range is from about 0.5 μm to about 14 μm.

In certain embodiments, the inorganic fibers may include but not be limited to at least one of glass fibers, leached silica fibers, high alumina fibers, mullite fibers, magnesium aluminosilicate fibers. S-2 glass fibers, or E-glass fibers.

In certain embodiments, the inorganic fibers may include other alumina/silica ceramic fibers, such as high alumina or mullite ceramic fibers, which may be made by sol gel processing, and usually contain more than 50 percent alumina. An example of such fibers is FIBERMAX® fibers, available from Unifrax I LLC of Tonawanda. New York. Magnesia/alumina/silicate fiber such as S2-GLASS, are commercially available from Owens Corning. Toledo, Ohio. S2-GLASS fibers typically contain from about 64 to about 66 percent silica, from about 24 to about 25 percent alumina, and from about 9 to about 10) percent magnesia.

Leached silica fibers may be leached in any manner and using any techniques known in the art. Generally, leaching may be accomplished by subjecting glass fibers to an acid solution or other solution suitable for extracting the non-siliceous oxides and other components from the fibers. A detailed description and process for making leached glass fibers high in silica content is contained in U.S. Pat. No. 2,624,658. Another process for making leached glass fibers high in silica content is disclosed in European Patent Application Publication No. 0973697.

Leached glass fibers are available under the trademark BELCOTEX from BelChem Fiber Materials GmbH. Germany, under the registered trademark REFRASIL from Hitco Carbon Composites. Inc. of Gardena California. and under the designation PS-23® from Polotsk-Steklovolokno. Republic of Belarus.

In certain embodiments, the at least one binder may comprise at least one of: (a) at least one inorganic binder; or (b) at least one organic binder. The at least one binder may comprise at least one inorganic binder. The at least one binder may comprise at least one inorganic binder and at least one organic binder. The at least one inorganic binder may comprise at least one of colloidal silica, colloidal alumina, colloidal zirconia or clay. The organic binder may comprise at least one of polymer emulsions, solvent-based polymers or solvent-free polymers. The polymer emulsions may comprise at least a latex. The latex may comprise at least one of natural rubber latexes, styrene-butadiene latexes, butadiene-acrylonitrile latexes, or latexes of acrylate/methacrylate polymers/copolymers. The solvent-based polymers may comprise at least one of acrylics, polyurethanes, vinyl acetate, celluloses, or rubber-based organic polymers. The solvent-free polymers may comprise at least one of natural rubber, styrene-butadiene rubber, or other elastomers. The at least one organic binder may comprise at least one starch, such as at least one of potato starch or corn starch. The at least one organic binder may comprise at least one phenolic binder. The at least one organic binder may comprise at least one type of polymeric binder fibers, such as at least one of polyvinyl alcohol fibers, polyolefin fibers such as polyethylene and polypropylene, acrylic fibers, polyester fibers, ethyl vinyl acetate fibers, or nylon fibers.

In certain embodiments the inorganic fibers are present in the rotating member in an amount of from about 30) to about 90 percent by weight, based on the dry weight of the rotating member. In certain embodiments the inorganic fibers are present in the rotating member in an amount of from about 35 to about 90 percent by weight, based on the dry weight of the rotating member. In certain embodiments the inorganic fibers are present in the rotating member in an amount of from about 40 to about 90 percent by weight, based on the dry weight of the rotating member. In certain embodiments the inorganic fibers are present in the rotating member in an amount of from about 45 to about 90 percent by weight, based on the dry weight of the rotating member. In certain embodiments the inorganic fibers are present in the rotating member in an amount of from about 50 to about 90 percent by weight, based on the dry weight of the rotating member. In certain embodiments the inorganic fibers are present in the rotating member in an amount of from about 55 to about 90 percent by weight, based on the dry weight of the rotating member. In certain embodiments the inorganic fibers are present in the rotating member in an amount of from about 60 to about 90 percent by weight, based on the dry weight of the rotating member. In certain embodiments the inorganic fibers are present in the rotating member in an amount of from about 65 to about 90 percent by weight, based on the dry weight of the rotating member. In certain embodiments the inorganic fibers are present in the rotating member in an amount of from about 70) to about 90 percent by weight, based on the dry weight of the rotating member. In certain embodiments the inorganic fibers are present in the rotating member in an amount of from about 75 to about 90 percent by weight, based on the dry weight of the rotating member. In certain embodiments the inorganic fibers are present in the rotating member in an amount of from about 80 to about 90 percent by weight, based on the dry weight of the rotating member. In certain embodiments the inorganic fibers are present in the rotating member in an amount of from about 85 to about 90 percent by weight, based on the dry weight of the rotating member.

In certain embodiments the inorganic fibers are present in the rotating member in an amount of from about 30) to about 85 percent by weight, based on the dry weight of the rotating member. In certain embodiments the inorganic fibers are present in the rotating member in an amount of from about 30 to about 80 percent by weight, based on the dry weight of the rotating member. In certain embodiments the inorganic fibers are present in the rotating member in an amount of from about 30 to about 75 percent by weight, based on the dry weight of the rotating member. In certain embodiments the inorganic fibers are present in the rotating member in an amount of from about 30 to about 70 percent by weight, based on the dry weight of the rotating member. In certain embodiments the inorganic fibers are present in the rotating member in an amount of from about 30 to about 65 percent by weight, based on the dry weight of the rotating member. In certain embodiments the inorganic fibers are present in the rotating member in an amount of from about 30 to about 60 percent by weight, based on the dry weight of the rotating member. In certain embodiments the inorganic fibers are present in the rotating member in an amount of from about 30 to about 55 percent by weight, based on the dry weight of the rotating member. In certain embodiments the inorganic fibers are present in the rotating member in an amount of from about 30 to about 50 percent by weight, based on the dry weight of the rotating member. In certain embodiments the inorganic fibers are present in the rotating member in an amount of from about to about 45 percent by weight, based on the dry weight of the rotating member. In certain embodiments the inorganic fibers are present in the rotating member in an amount of from about 30 to about 40) percent by weight, based on the dry weight of the rotating member. In certain embodiments the inorganic fibers are present in the rotating member in an amount of from about 30 to about 35 percent by weight, based on the dry weight of the rotating member.

In certain embodiments, the at least one binder is present in the rotating member in an amount of from about 20 to about 70 percent by weight, based on the dry weight of the rotating member. In certain embodiments, the at least one binder is present in the rotating member in an amount of from about 20 to about 65 percent by weight, based on the dry weight of the rotating member. In certain embodiments, the at least one binder is present in the rotating member in an amount of from about 20 to about 60 percent by weight, based on the dry weight of the rotating member. In certain embodiments, the at least one binder is present in the rotating member in an amount of from about 20 to about 55 percent by weight, based on the dry weight of the rotating member. In certain embodiments, the at least one binder is present in the rotating member in an amount of from about 20 to about 50 percent by weight, based on the dry weight of the rotating member. In certain embodiments, the at least one binder is present in the rotating member in an amount of from about 20 to about 45 percent by weight, based on the dry weight of the rotating member. In certain embodiments, the at least one binder is present in the rotating member in an amount of from about 20 to about 40 percent by weight, based on the dry weight of the rotating member. In certain embodiments, the at least one binder is present in the rotating member in an amount of from about 20 to about 35 percent by weight, based on the dry weight of the rotating member. In certain embodiments, the at least one binder is present in the rotating member in an amount of from about 20 to about 30 percent by weight, based on the dry weight of the rotating member. In certain embodiments, the at least one binder is present in the rotating member in an amount of from about 20 to about 25 percent by weight, based on the dry weight of the rotating member.

In certain embodiments, the at least one binder is present in the rotating member in an amount of from about 25 to about 70 percent by weight, based on the dry weight of the rotating member. In certain embodiments, the at least one binder is present in the rotating member in an amount of from about 30 to about 70 percent by weight, based on the dry weight of the rotating member. In certain embodiments, the at least one binder is present in the rotating member in an amount of from about 35 to about 70 percent by weight, based on the dry weight of the rotating member. In certain embodiments, the at least one binder is present in the rotating member in an amount of from about 40 to about 70) percent by weight, based on the dry weight of the rotating member. In certain embodiments, the at least one binder is present in the rotating member in an amount of from about 45 to about 70 percent by weight, based on the dry weight of the rotating member. In certain embodiments, the at least one binder is present in the rotating member in an amount of from about 50 to about 70 percent by weight, based on the dry weight of the rotating member. In certain embodiments, the at least one binder is present in the rotating member in an amount of from about 55 to about 70 percent by weight, based on the dry weight of the rotating member. In certain embodiments, the at least one binder is present in the rotating member in an amount of from about 60 to about 70 percent by weight, based on the dry weight of the rotating member. In certain embodiments, the at least one binder is present in the rotating member in an amount of from about 65 to about 70 percent by weight, based on the dry weight of the rotating member.

In certain embodiments, the colloidal inorganic oxide is present in the rotating member in an amount of from about 40) to about 80 percent by weight, based on the dry weight of the rotating member. In certain embodiments, the colloidal inorganic oxide is present in the rotating member in an amount of from about 40) to about 75 percent by weight, based on the dry weight of the rotating member. In certain embodiments, the colloidal inorganic oxide is present in the rotating member in an amount of from about 40) to about 70 percent by weight, based on the dry weight of the rotating member. In certain embodiments, the colloidal inorganic oxide is present in the rotating member in an amount of from about 40) to about 65 percent by weight, based on the dry weight of the rotating member. In certain embodiments, the colloidal inorganic oxide is present in the rotating member in an amount of from about 40) to about 60 percent by weight, based on the dry weight of the rotating member. In certain embodiments, the colloidal inorganic oxide is present in the rotating member in an amount of from about 40) to about 55 percent by weight, based on the dry weight of the rotating member. In certain embodiments, the colloidal inorganic oxide is present in the rotating member in an amount of from about 40) to about 50 percent by weight, based on the dry weight of the rotating member. In certain embodiments, the colloidal inorganic oxide is present in the rotating member in an amount of from about 40) to about 45 percent by weight, based on the dry weight of the rotating member.

In certain embodiments, the colloidal inorganic oxide is present in the rotating member in an amount of from about 45 to about 80 percent by weight, based on the dry weight of the rotating member. In certain embodiments, the colloidal inorganic oxide is present in the rotating member in an amount of from about 50 to about 80 percent by weight, based on the dry weight of the rotating member. In certain embodiments, the colloidal inorganic oxide is present in the rotating member in an amount of from about 55 to about 80 percent by weight, based on the dry weight of the rotating member. In certain embodiments, the colloidal inorganic oxide is present in the rotating member in an amount of from about 60) to about 80 percent by weight, based on the dry weight of the rotating member. In certain embodiments, the colloidal inorganic oxide is present in the rotating member in an amount of from about 65 to about 80 percent by weight, based on the dry weight of the rotating member. In certain embodiments, the colloidal inorganic oxide is present in the rotating member in an amount of from about 70) to about 80 percent by weight, based on the dry weight of the rotating member. In certain embodiments, the colloidal inorganic oxide is present in the rotating member in an amount of from about 75 to about 80 percent by weight, based on the dry weight of the rotating member.

In certain embodiments, the rotating member may further comprise at least one filler, such as at least one of tabular alumina, calcined alumina, hydrated alumina, at least one other high alumina material, at least one clay, zirconia, spinel, silica, magnesia, calcia, mullite, silicon carbide, or silicon nitride.

In certain embodiments, the at least one filler is present in the rotating member in an amount of from about 5 to about 75 percent by weight, based on the dry weight of the rotating member. In certain embodiments, the at least one filler is present in the rotating member in an amount of from about 5 to about 70 percent by weight, based on the dry weight of the rotating member. In certain embodiments, the at least one filler is present in the rotating member in an amount of from about 5 to about 65 percent by weight, based on the dry weight of the rotating member. In certain embodiments, the at least one filler is present in the rotating member in an amount of from about 5 to about 60 percent by weight, based on the dry weight of the rotating member. In certain embodiments, the at least one filler is present in the rotating member in an amount of from about 5 to about 55 percent by weight, based on the dry weight of the rotating member. In certain embodiments, the at least one filler is present in the rotating member in an amount of from about 5 to about 50 percent by weight, based on the dry weight of the rotating member. In certain embodiments, the at least one filler is present in the rotating member in an amount of from about 5 to about 45 percent by weight, based on the dry weight of the rotating member. In certain embodiments, the at least one filler is present in the rotating member in an amount of from about 5 to about 40 percent by weight, based on the dry weight of the rotating member. In certain embodiments, the at least one filler is present in the rotating member in an amount of from about 5 to about 35 percent by weight, based on the dry weight of the rotating member. In certain embodiments, the at least one filler is present in the rotating member in an amount of from about 5 to about 30 percent by weight, based on the dry weight of the rotating member. In certain embodiments, the at least one filler is present in the rotating member in an amount of from about 5 to about 25 percent by weight, based on the dry weight of the rotating member. In certain embodiments, the at least one filler is present in the rotating member in an amount of from about 5 to about 20 percent by weight, based on the dry weight of the rotating member. In certain embodiments, the at least one filler is present in the rotating member in an amount of from about 5 to about 15 percent by weight, based on the dry weight of the rotating member. In certain embodiments, the at least one filler is present in the rotating member in an amount of from about 5 to about 10 percent by weight, based on the dry weight of the rotating member.

In certain embodiments, the at least one filler is present in the rotating member in an amount of from about 10 to about 75 percent by weight, based on the dry weight of the rotating member. In certain embodiments, the at least one filler is present in the rotating member in an amount of from about 15 to about 75 percent by weight, based on the dry weight of the rotating member. In certain embodiments, the at least one filler is present in the rotating member in an amount of from about 20 to about 75 percent by weight, based on the dry weight of the rotating member. In certain embodiments, the at least one filler is present in the rotating member in an amount of from about 25 to about 75 percent by weight, based on the dry weight of the rotating member. In certain embodiments, the at least one filler is present in the rotating member in an amount of from about 30 to about 75 percent by weight, based on the dry weight of the rotating member. In certain embodiments, the at least one filler is present in the rotating member in an amount of from about 35 to about 75 percent by weight, based on the dry weight of the rotating member. In certain embodiments, the at least one filler is present in the rotating member in an amount of from about 40 to about 75 percent by weight, based on the dry weight of the rotating member. In certain embodiments, the at least one filler is present in the rotating member in an amount of from about 45 to about 75 percent by weight, based on the dry weight of the rotating member. In certain embodiments, the at least one filler is present in the rotating member in an amount of from about 50 to about 75 percent by weight, based on the dry weight of the rotating member. In certain embodiments, the at least one filler is present in the rotating member in an amount of from about 55 to about 75 percent by weight, based on the dry weight of the rotating member. In certain embodiments, the at least one filler is present in the rotating member in an amount of from about 60 to about 75 percent by weight, based on the dry weight of the rotating member. In certain embodiments, the at least one filler is present in the rotating member in an amount of from about 65 to about 75 percent by weight, based on the dry weight of the rotating member. In certain embodiments, the at least one filler is present in the rotating member in an amount of from about 70 to about 75 percent by weight, based on the dry weight of the rotating member.

In certain embodiments, the rotating member may be able to withstand temperatures of at least about 1.000° C. such as at least about 1.050° C. 1.100° C. 1.150° C. 1.200° C. 1.250° C. 1.300° C. 1.350° C. 1.400° C. 1.450° C., or 1.500° C.

In certain embodiments, the rotating member may have a density of at least about 400 kg/m$^3$, such as at least about 425 kg/m$^3$, 450 kg/m$^3$, 475 kg/m$^3$, 500 kg/m$^3$, 525 kg/m$^3$, 550 kg/m$^3$, 575 kg/m$^3$, 600 kg/m$^3$, 625 kg/m$^3$, 650 kg/m$^3$, 675 kg/m$^3$, or 700 kg/m$^3$.

In certain embodiments, the rotating member may have a thermal conductivity of equal to or less than about 0.45 W/m·K, such as equal to or less than 0.4 W/m·K, 0.35 W/m·K, 0.3 W/m·K, 0.25 W/m·K, 0.2 W/m·K or 0.15 W/m·K, at a temperature of from about 700° C. to about 800° C.

In certain embodiments, the rotating member may shrink by no more than about 5%, such as by no more than about 4.5%, 4%, 3.5%, 3%, 2.5% or 2%, at a temperature of about 1.000° C. In certain embodiments, the rotating member may shrink by no more than about 10%, such as by no more than about 9%, 8%, 7%, 6% or 5%, at a temperature of about 1.500° C.

In certain embodiments, the rotating member may have a compressive resistance of at least about 50 kg/cm$^2$, such as at least about 55 kg/cm$^2$, 60 kg/cm$^2$, 65 kg/cm$^2$, 70 kg/cm$^2$, 75 kg/cm$^2$, 80 kg/cm$^2$, 85 kg/cm$^2$ or 90 kg/cm$^2$.

In certain embodiments, increasing the abrasion resistance of the rotating member may be desirable. This may be accomplished by treating the surface of the rotating member with a physical and/or chemical treatment, such as coating the rotating member. The coating material may comprise boron nitride, which may significantly increase the abrasion resistance of the rotating member.

In certain embodiments, the rotating member may further comprise at least one coating material applied to at least a portion of an exterior surface of the rotating member. The coating material may be any material which is suitable for a particular intended use. For example, refractory coating materials may be used to increase the refractoriness of the substrate, while boron nitride may be used to increase the abrasion resistance of the substrate. Within a single embodiment of a valve as described herein, various portions of the valve may be coated with different materials depending on the resistance a particular portion may need to have based on the materials it will come into contact with during use.

The coating material may comprise inorganic fibers and at least one binder. The coating material may comprise inorganic fibers, at least one binder, and at least one silica-containing compound. The coating material may comprise inorganic fibers, at least one organic binder, at least one inorganic binder, and at least one silica-containing compound. The coating material may comprises low biopersistence inorganic fibers. The coating material may comprise a gelling agent. The coating material may comprises a thickening agent. The coating material may comprise at least one colloidal inorganic oxide. The coating material may be substantially free of alumina.

In certain embodiments, the housing may comprise any material which is suitable for retaining the rotating member within the valve such that the rotating member may operate as intended for a particular use. In certain embodiments, the housing may comprise inorganic fibers and at least one binder, and optionally at least one colloidal inorganic oxide and/or optionally at least one filler. In certain embodiments, the amounts and/or compositions of the inorganic fibers, binders, colloidal inorganic oxide, and/or fillers present in the housing may be the same as those described above with regard to the rotating member. However, the compositions of the rotating member and the housing may be determined independently, and therefore may or may not be the same as each other in a particular embodiment.

In certain embodiments, the housing may have similar physical properties as those described above with regard to the rotating member. The physical properties of the rotating member and the housing will be selected independently for a particular intended use of the valve described herein. In certain embodiments, it may be desirable that the housing and rotating member have similar physical properties, while in alternative embodiments, different physical properties may be desired.

Also provided is an exhaust apparatus comprising the valve of any of the embodiments described above. Further provided is a coke oven system comprising at least one such exhaust apparatus.

In certain embodiments, provided is a method of manufacturing a rotating member for a valve comprising: preparing an aqueous slurry comprising inorganic fibers and at least one binder; contacting the aqueous slurry with a mold having a shape substantially similar to the shape of the rotating member; vacuum casting the slurry into and/or onto the mold to form a green shape; and drying the green shape to form a dried shape which forms the rotating member. The mold will necessarily be at least partially permeable, so that the vacuum casting step will allow the liquid portion of the slurry to pass through the mold, and the solid portion of the slurry to accumulate into/onto the mold.

In certain embodiments, provided is a method of manufacturing a rotating member for a valve comprising: preparing an aqueous slurry comprising inorganic fibers and at least one binder; contacting the aqueous slurry with a mold having a generally cylindrical shape; vacuum casting the slurry into and/or onto the mold to form a green shape; drying the green shape to form a dried shape; and removing material from the dried shape to form the rotating member. Said removing material may comprises machining the dried shape to remove material such that the shape meets the specifications required for a particular intended use.

In certain embodiments, provided is a method of manufacturing a rotating member for a valve comprising: preparing an aqueous slurry comprising inorganic fibers and at least one binder; contacting the aqueous slurry with a plurality of molds; vacuum casting the slurry into and/or onto the molds to form a plurality of green shapes; drying the green shapes to form a plurality of dried shapes; optionally removing material from at least one of the dried shapes to form at least one refined shape; and assembling the dried shapes and/or the refined shape(s) to form the rotating member.

In certain embodiments, said drying comprises drying the shape(s) in an oven at a temperature ranging from about 40° C. to about 350° C. optionally from about 80° C. to about 150° C. for a time period ranging from about 2 to about 6 minutes, or from about 10 minutes to about one hour.

In certain embodiments, prior to said drying, the green shape(s) may be refined, such as by compressing in mold and/or rolling the shape on a flat surface to smooth the outer surface of the shape.

After said drying, the dried shape(s) may impregnated with colloidal silica. Said impregnation may accomplished by soaking the dried shape(s) in a colloidal silica bath. The impregnation of the shape(s) with a colloidal silica material may increase the hardness of the resulting shape(s).

In certain embodiments, at least a portion of an exterior surface of the rotating member may be coated with a coating material.

Also provided are rotating members manufactured according to the methods described above, a valve comprising a housing and such a rotating member, an exhaust apparatus comprising such a valve, and a coke oven system comprising such an exhaust apparatus.

Also provided is a method of retrofitting an exhaust system for a coke oven comprising: removing a portion of the exhaust system to accommodate a valve as described herein; and placing the valve into the removed portion of the exhaust system to form a retrofitted exhaust system. For example, a portion of an ascension duct may be removed, and the valve placed in the space provided by removing the portion of the ascension duct.

Further provided is a method of retrofitting an exhaust system for a coke oven, wherein the exhaust system comprises an angled portion and a vertical portion, the method comprising: removing the angled portion; modifying the angled portion to form a modified angled portion such that the modified angled portion accommodates a valve as described herein; placing the valve into the exhaust system in contact with the vertical portion; and placing the modified angled portion adjacent to the valve to form a retrofitted exhaust system.

Further provided is a method of retrofitting an exhaust system for a coke oven, wherein the exhaust system comprises an angled portion and a vertical portion, the method comprising: removing the angled portion; modifying the angled portion to form a modified angled portion, and modifying the vertical portion to form a modified vertical portion, such that, together, the modified angled portion and modified vertical portion accommodate a valve as described herein; placing the valve into the exhaust system such that the valve occupies a space created via said modifying the vertical portion; and placing the modified angled portion in contact with the valve to form a retrofitted exhaust system.

Figure 2:
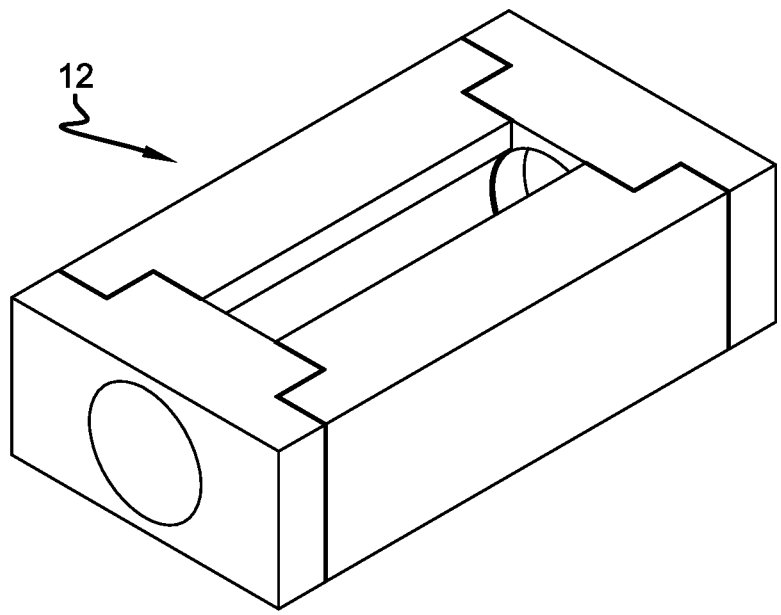
FIG. 2 is a perspective view of an illustrative housing for a valve according to the present subject matter.
Figure 3:
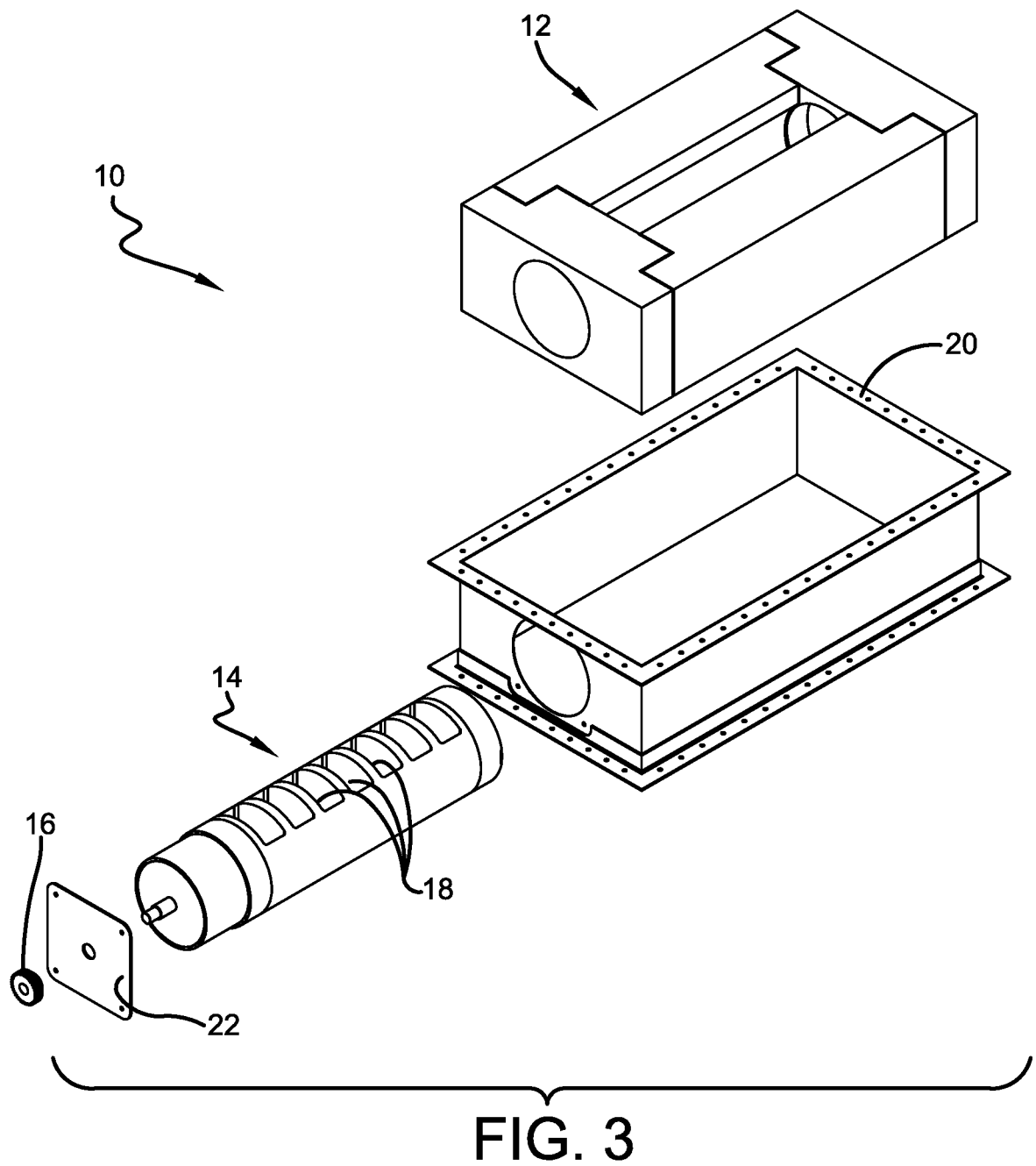
FIG. 3 is a perspective, exploded view of an illustrative valve according to the present subject matter.
Figure 4:
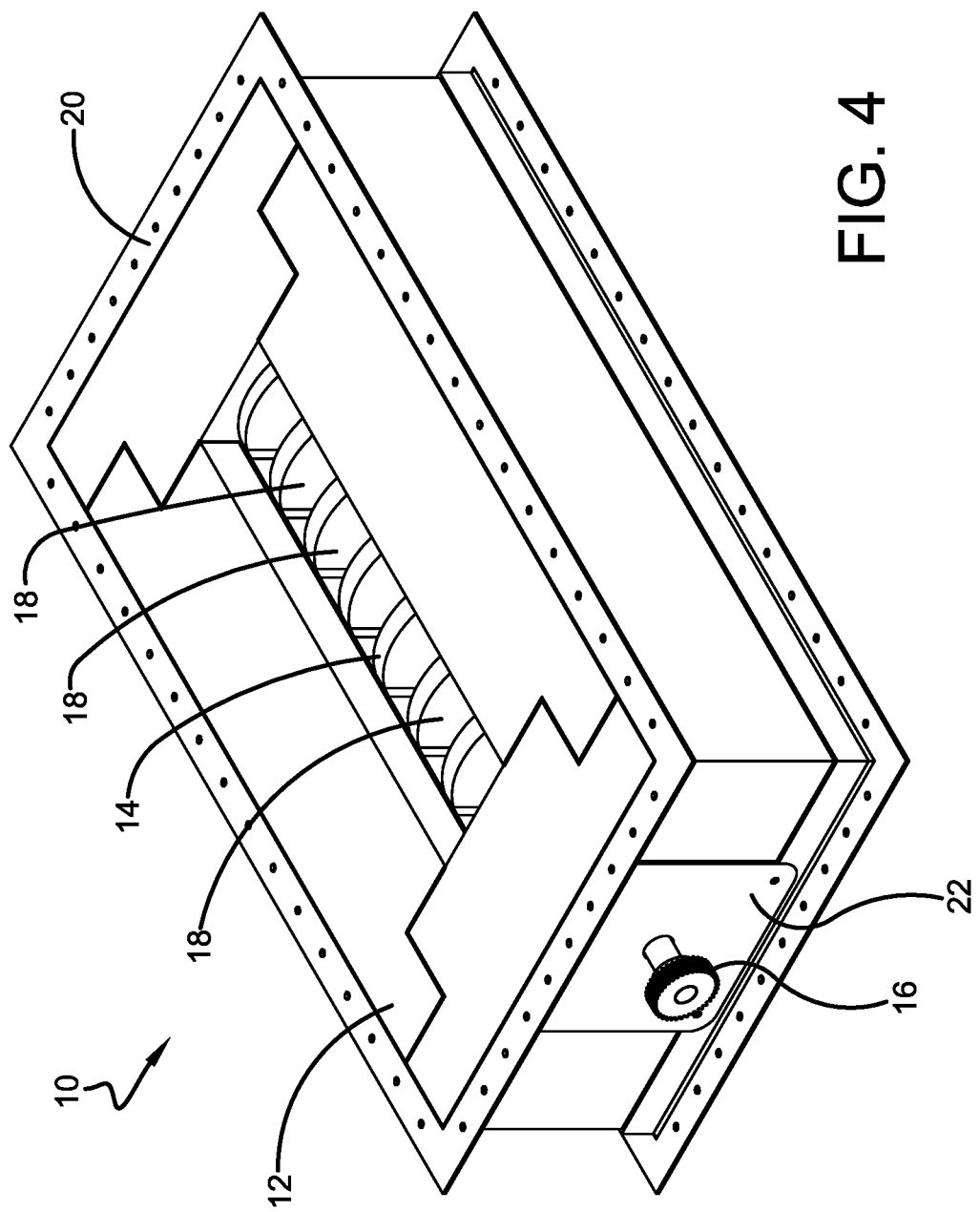
FIG. 4 is a perspective view of the valve shown in exploded form in FIG. 3.
Figure 5:
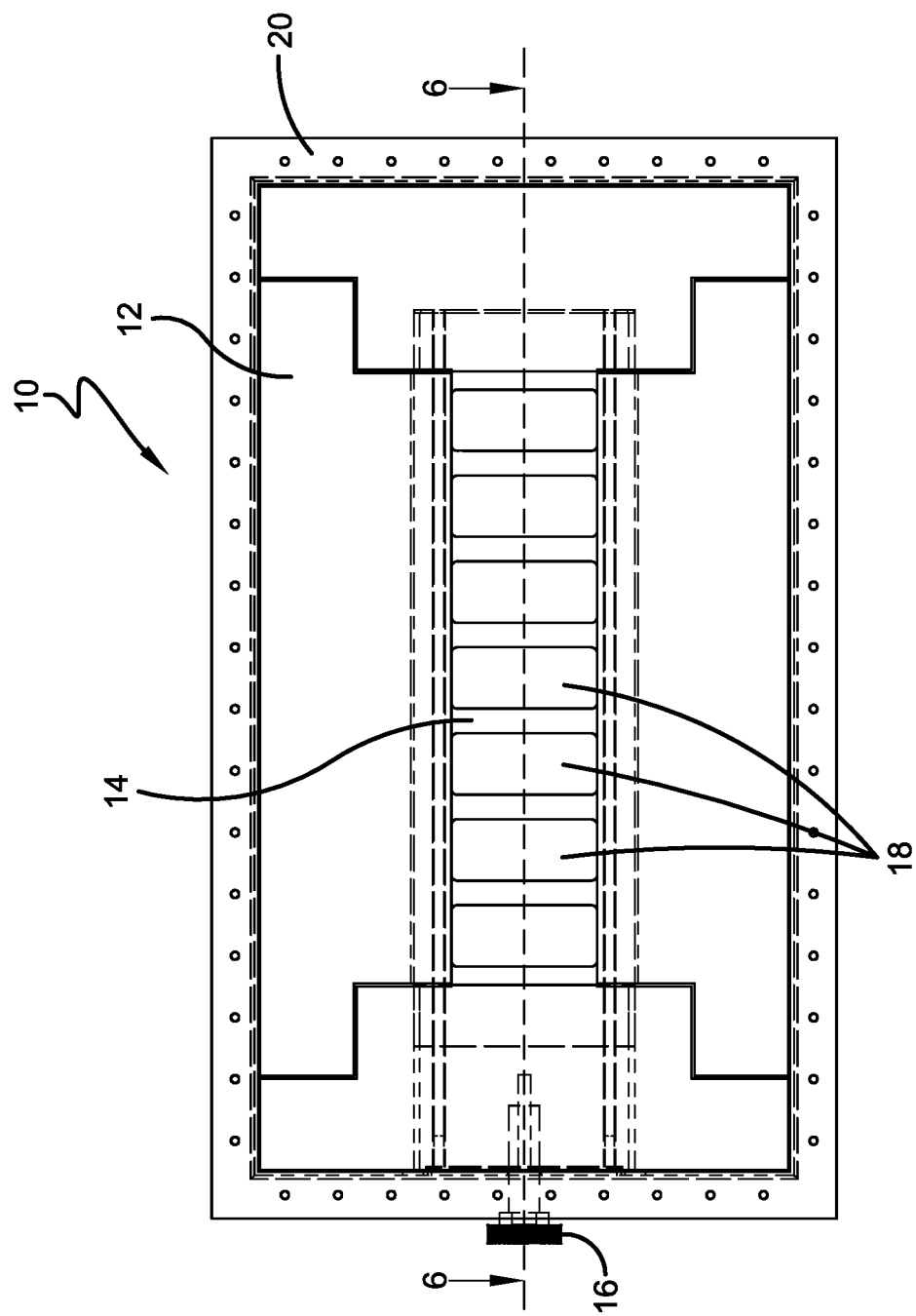
FIG. 5 is a side view of the valve shown in FIG. 4.
Figure 6:
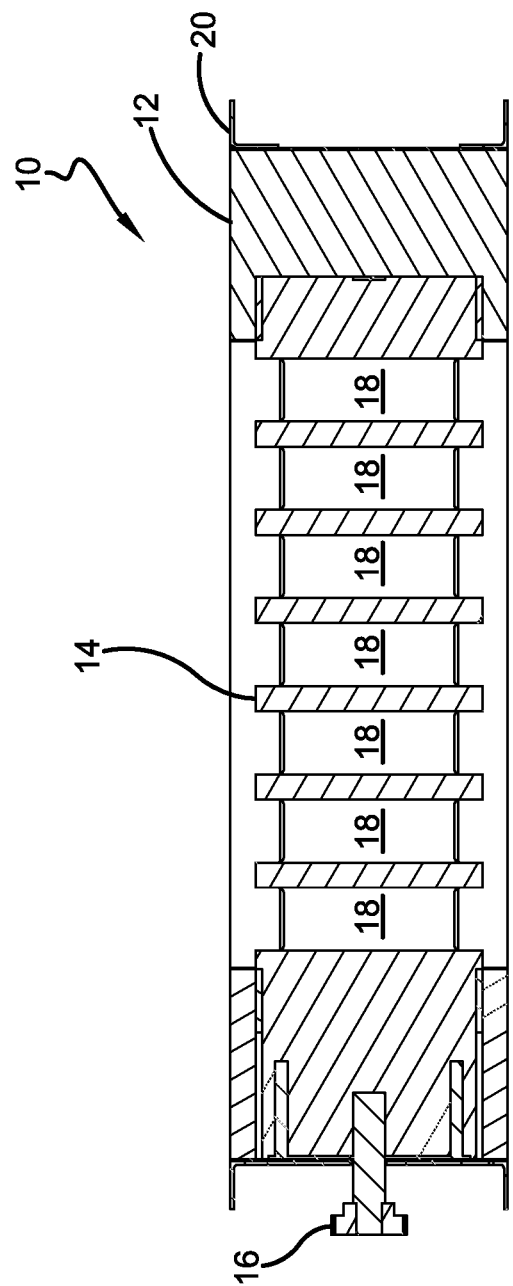
FIG. 6 is a cross-sectional view of the valve shown in FIG. 4.

Referring now to the drawings. FIG. 1 shows an illustrative rotating member 14, having cavities 18 therethrough, wherein the rotating member 14 is made from a single vacuum-formed shape. FIG. 2 shows an illustrative housing 12. The rotating member 14 and the housing 12 may be assembled as shown in FIG. 3. FIG. 3 shows an exploded view of an illustrative valve 10 having a housing 12, a rotating member 14 with cavities 18, an actuator 16, a housing shell 20 and a cover plate 22. FIG. 4 shows a perspective view of the valve 10 of FIG. 3 in an assembled state. FIG. 5 shows a top view of the valve 10 of FIGS. 3 and 4. FIG. 6 shows a cross-sectional view of the valve 10 of FIG. 5, through line "6" shown in FIG. 5.

Figure 7A:
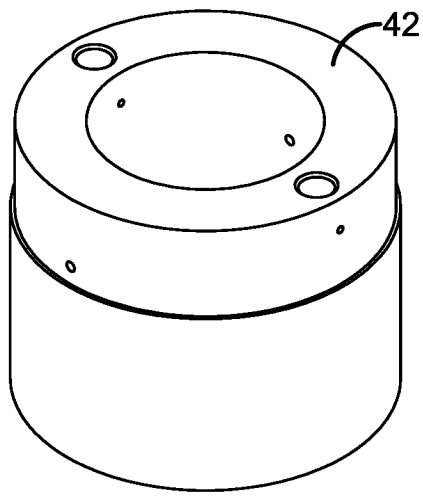
FIG. 7A is a perspective view of an illustrative part which may be used to form a rotating member of a valve according to the present subject matter.
Figure 7B:
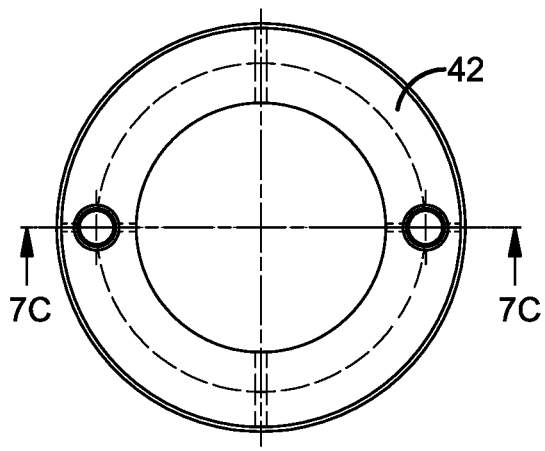
FIG. 7B is a top view of the part shown in FIG. 7A.
Figure 7C:
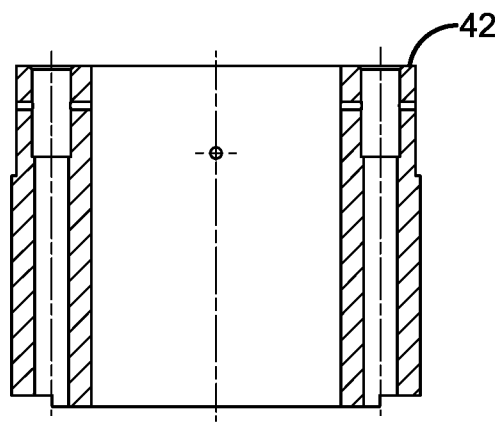
FIG. 7C is schematic, cross-sectional view of the part shown in FIG. 7A.
Figure 10:
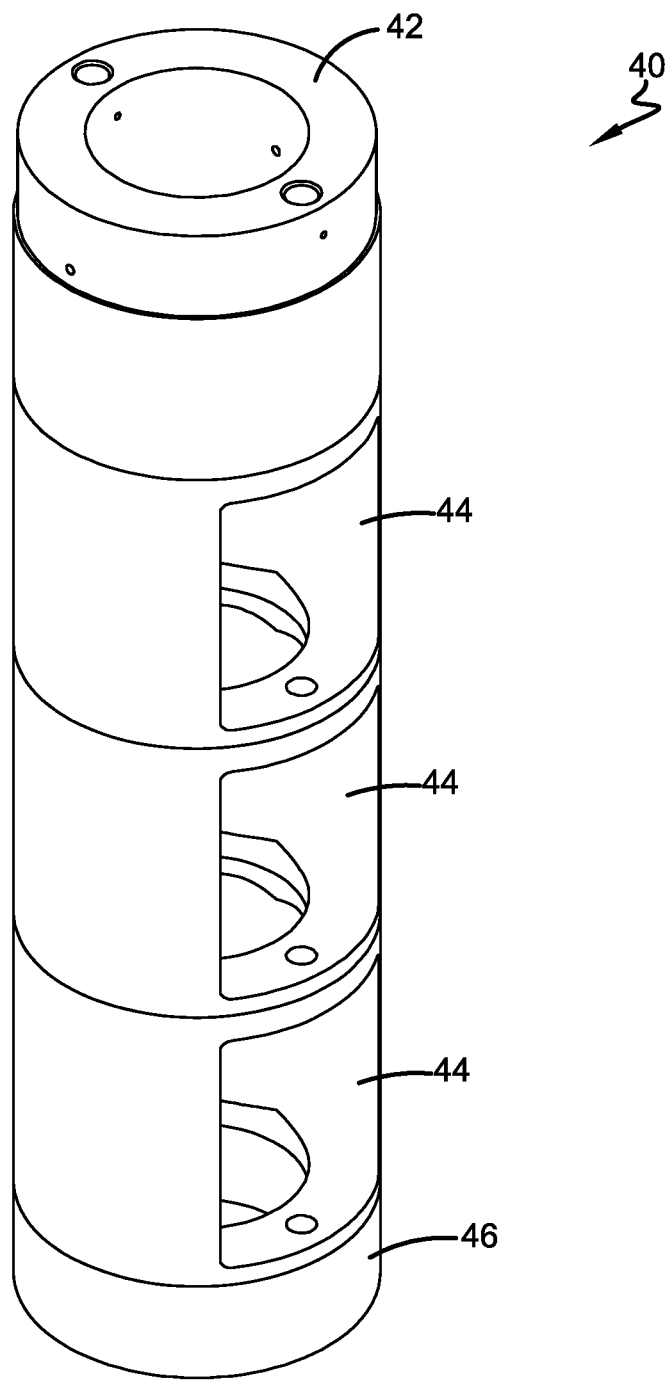
FIG. 10 is a perspective view of the parts shown in FIGS. 7 to 9 assembled to form an illustrative rotating member of a valve according to the present subject matter.
Figure 11A:
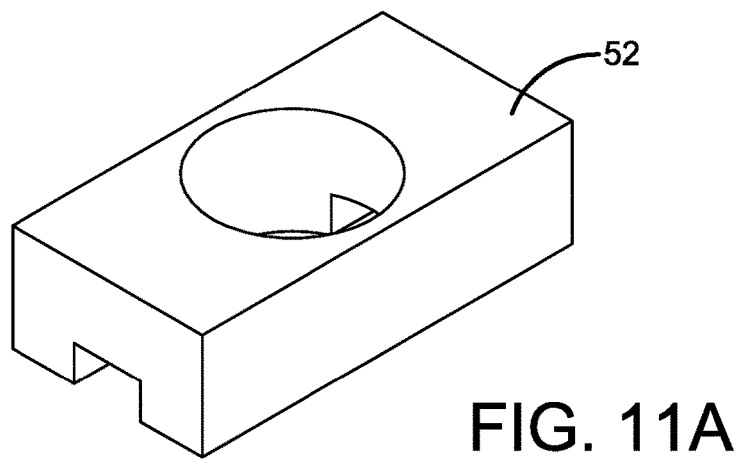
FIGS. 11A-D are various views of a part which may be used to form a housing of a valve according to the present subject matter, as described in more detail below.
Figure 11B:
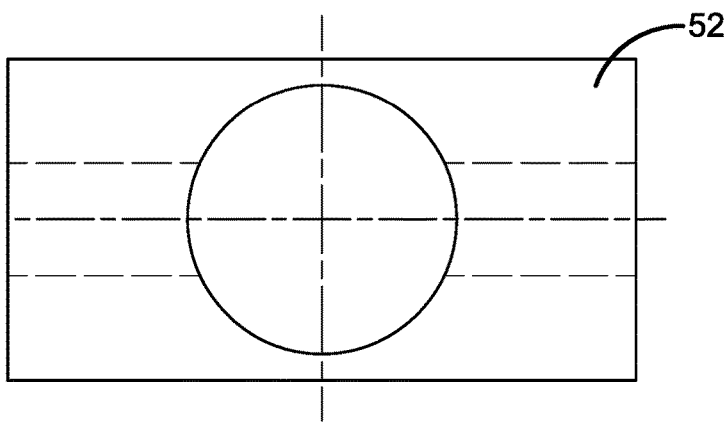
Figure 11C:
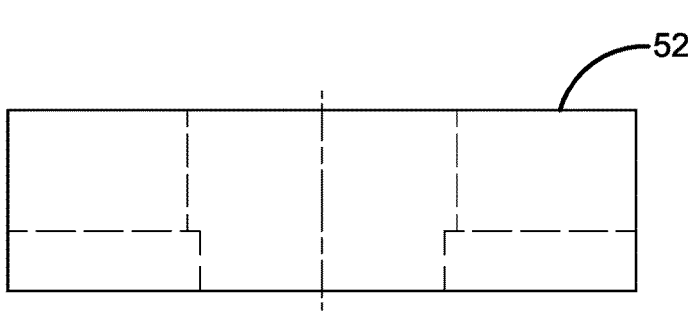
Figure 11D:
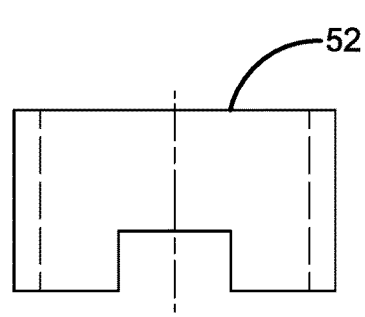
Figure 12A:
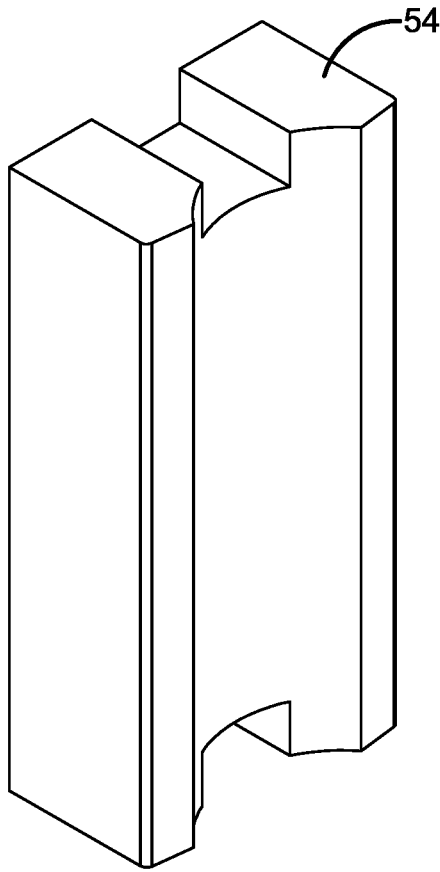
FIGS. 12A-D are various views of a part which may be used to form a housing of a valve according to the present subject matter, as described in more detail below.
Figure 12B:
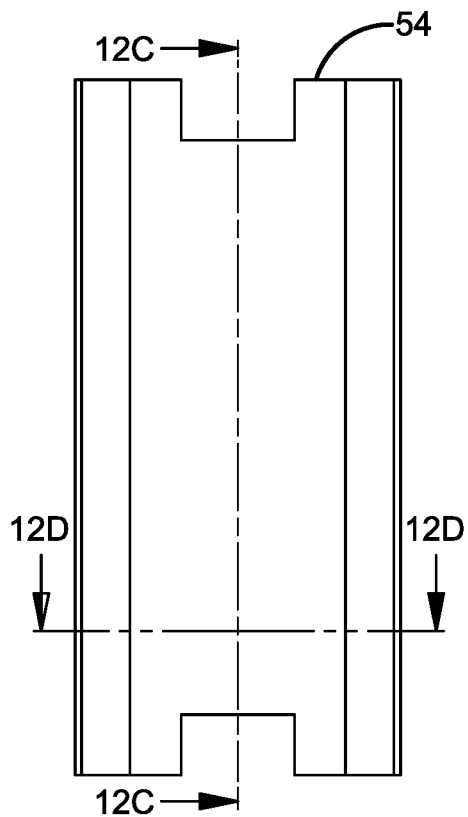
Figure 12C:
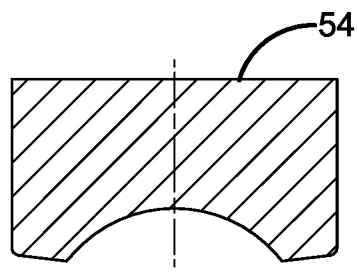
Figure 12D:
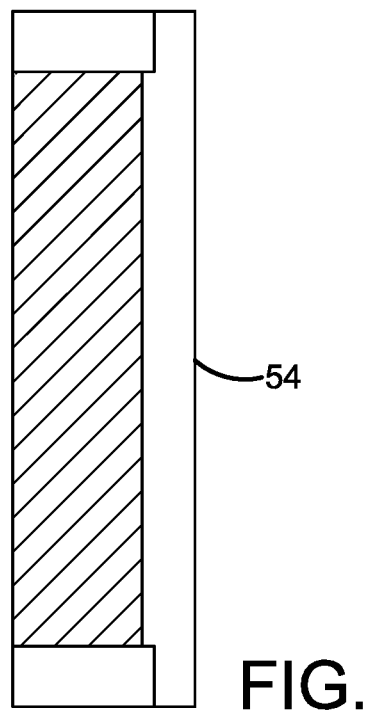
Figure 13A:
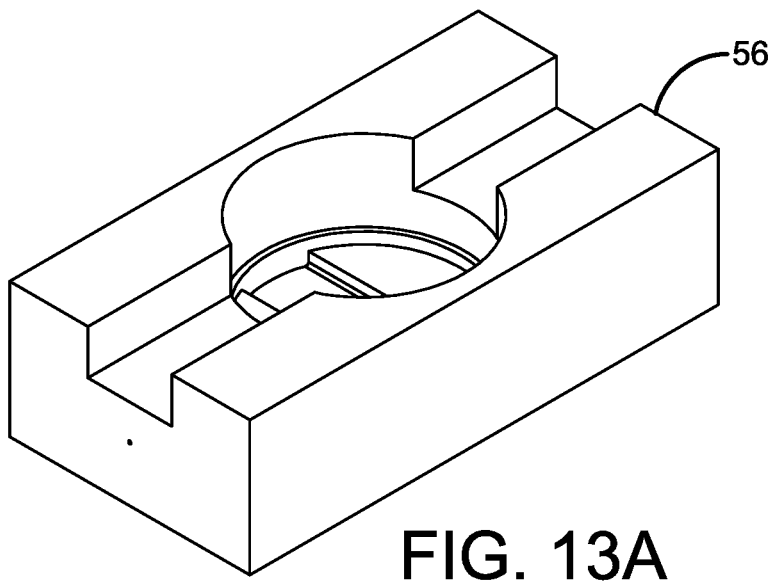
FIGS. 13A-D are various views of a part which may be used to form a housing of a valve according to the present subject matter, as described in more detail below.
Figure 13B:
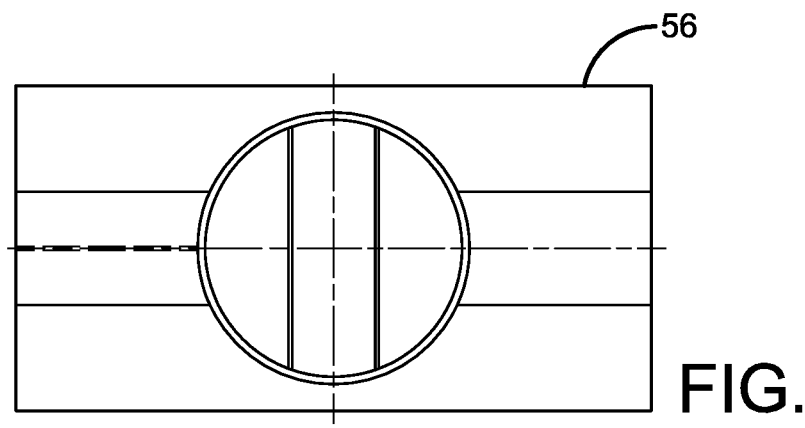
Figure 13C:
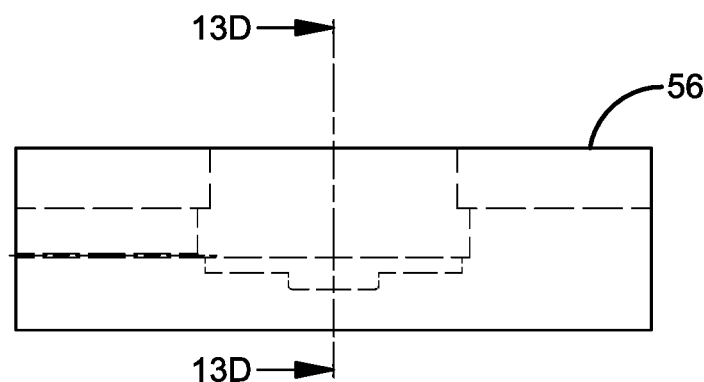
Figure 13D:
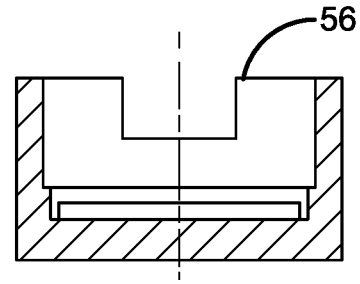
Figure 16A:
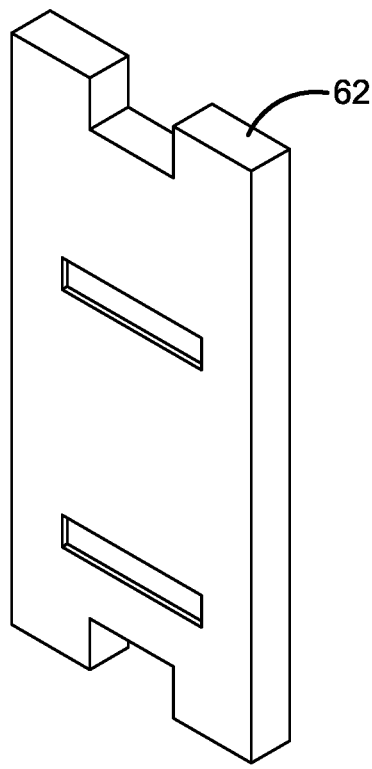
FIGS. 16A-C are various views of a part which may be used to form a housing of a valve according to the present subject matter, as described in more detail below.
Figure 16B:
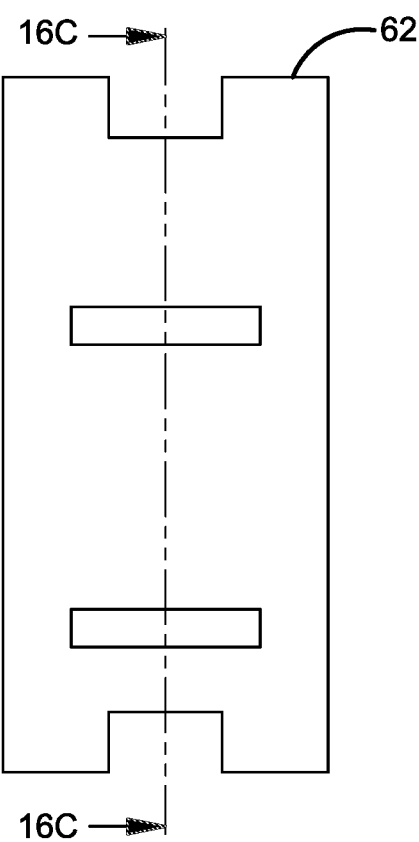
Figure 16C:
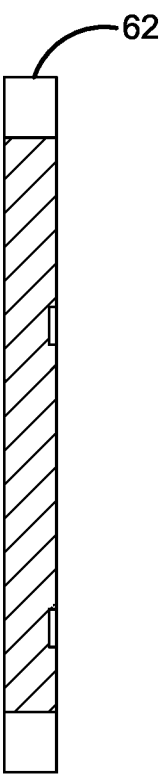

FIG. 7A shows a perspective view of a first end portion 42 of the rotating member 40 shown in FIG. 10. FIG. 7B shows a top view of the first end portion 42 shown in FIG. 7A. FIG. 7C shows a cross-sectional view of the first end portion 42 shown in FIGS. 7A and 7B, through line "7C" shown in FIG. 7B.

Figure 8A:
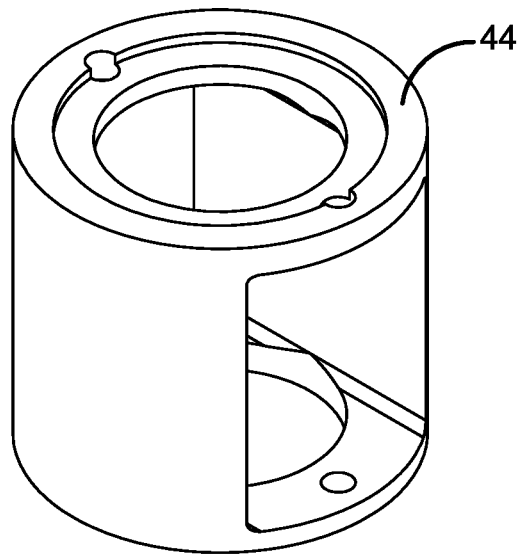
FIG. 8A is a perspective view of an illustrative part which may be used to form a rotating member of a valve according to the present subject matter.
Figure 8B:
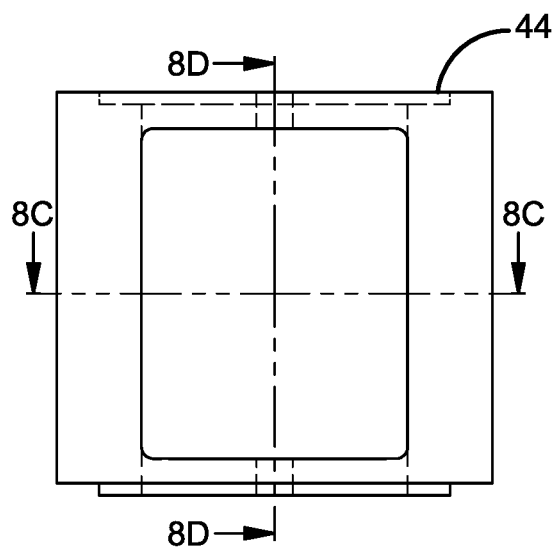
FIG. 8B is a side view of the part shown in FIG. 8A.
Figure 8C:
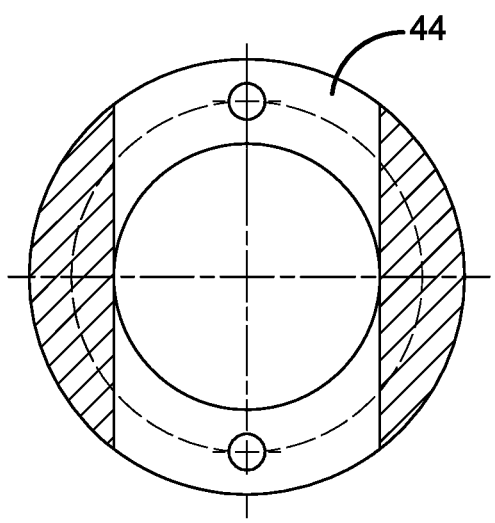
FIG. 8C is a top view of the part shown in FIG. 8A.
Figure 8D:
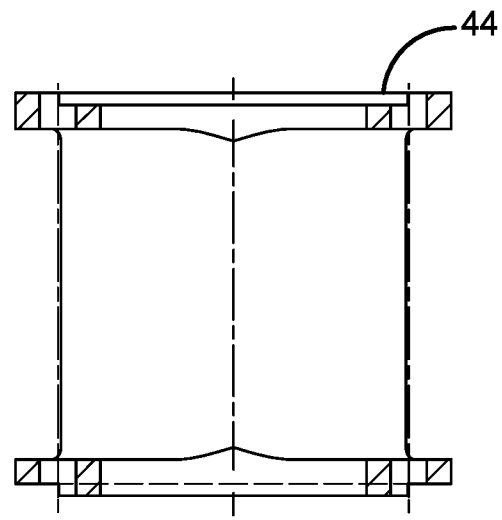
FIG. 8D is a cross-sectional view of the part shown in FIG. 8A.

FIG. 8A shows a perspective view of a middle portion 44 of the rotating member 40 shown in FIG. 10. FIG. 8B shows a side view of the middle portion 44, and FIG. 8C shows a top view of the middle portion 44, shown in FIG. 8A. FIG. 8D shows a cross-sectional view of the middle portion 44 shown in FIGS. 8A to 8C.

Figure 9A:
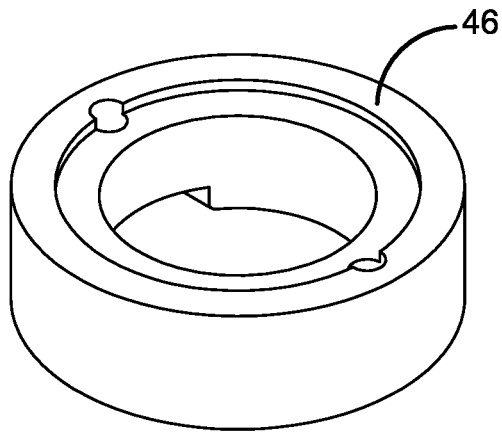
FIG. 9A is a perspective view of an illustrative part which may be used to form a rotating member of a valve according to the present subject matter.
Figure 9B:
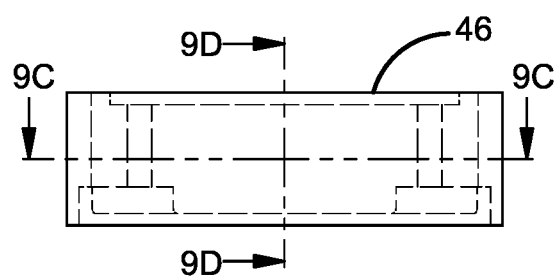
FIG. 9B is a side view of the part shown in FIG. 9A.
Figure 9C:
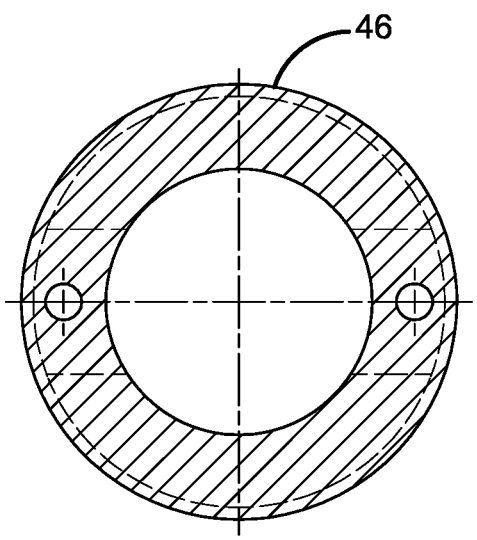
FIG. 9C is a top view of the part shown in FIG. 9A.
Figure 9D:
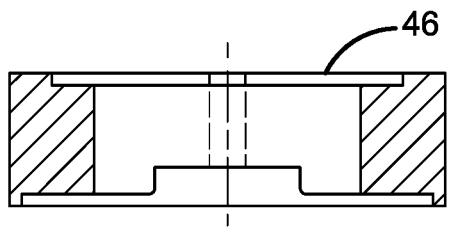
FIG. 9D is a cross-sectional view of the part shown in FIG. 9A.

FIG. 9A shows a perspective view of a second end portion 46 of the rotating member 40 shown in FIG. 10. FIG. 9B shows a side view of the second end portion 46, and FIG. 9C shows a top view of the second end portion 46, shown in FIG. 9A. FIG. 9D shows a cross-sectional view of the second end portion 46 shown in FIGS. 9A to 9C.

FIG. 10 shows a perspective view of an illustrative rotating member 40, having a first end portion 42, middle portions 44 and a second end portion 46. As shown in FIG. 10, the rotating member has three middle portions 44, but it is to be understood that a rotating member may be formed from any number of middle portions 44, depending on the desired length of a desired rotating member.

Figure 17:
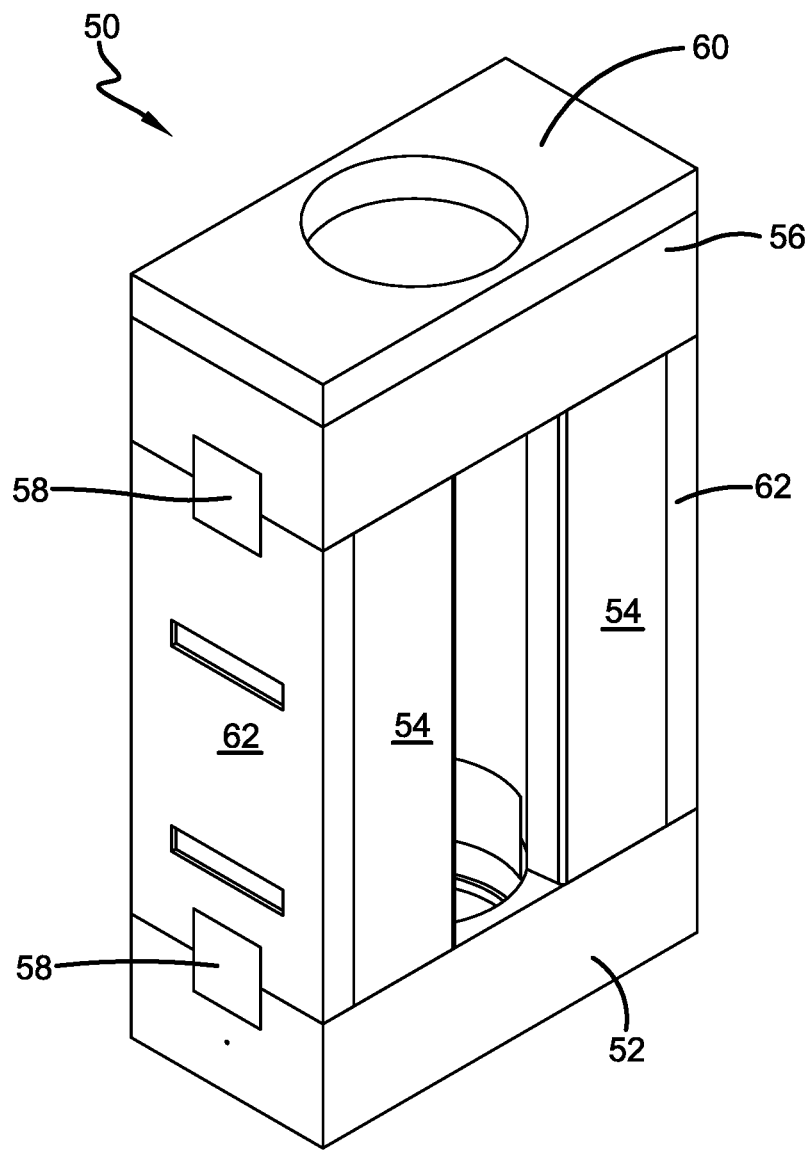
FIG. 17 is a perspective view of the parts shown in FIGS. 11 to 16 assembled to form a housing of a valve according to the present subject matter.

FIGS. 11 through 16 show various views of parts which may be assembled to make a housing, as shown in FIG. 17. FIG. 17 shows an illustrative housing 50, having:
 a first end portion 52 (shown in FIGS. 11A to 11D);
 interior side portions 54 (shown in FIGS. 12A to 12D);
 interior portion, second end 56 (shown in FIGS. 13A to 13D);
 joint portions 58 (shown in FIGS. 14A to 14C);
 exterior portion, second end 60 (shown in FIGS. 15A to 15C); and
 exterior side portions 62 (shown in FIGS. 16A to 16C).

Figure 18:
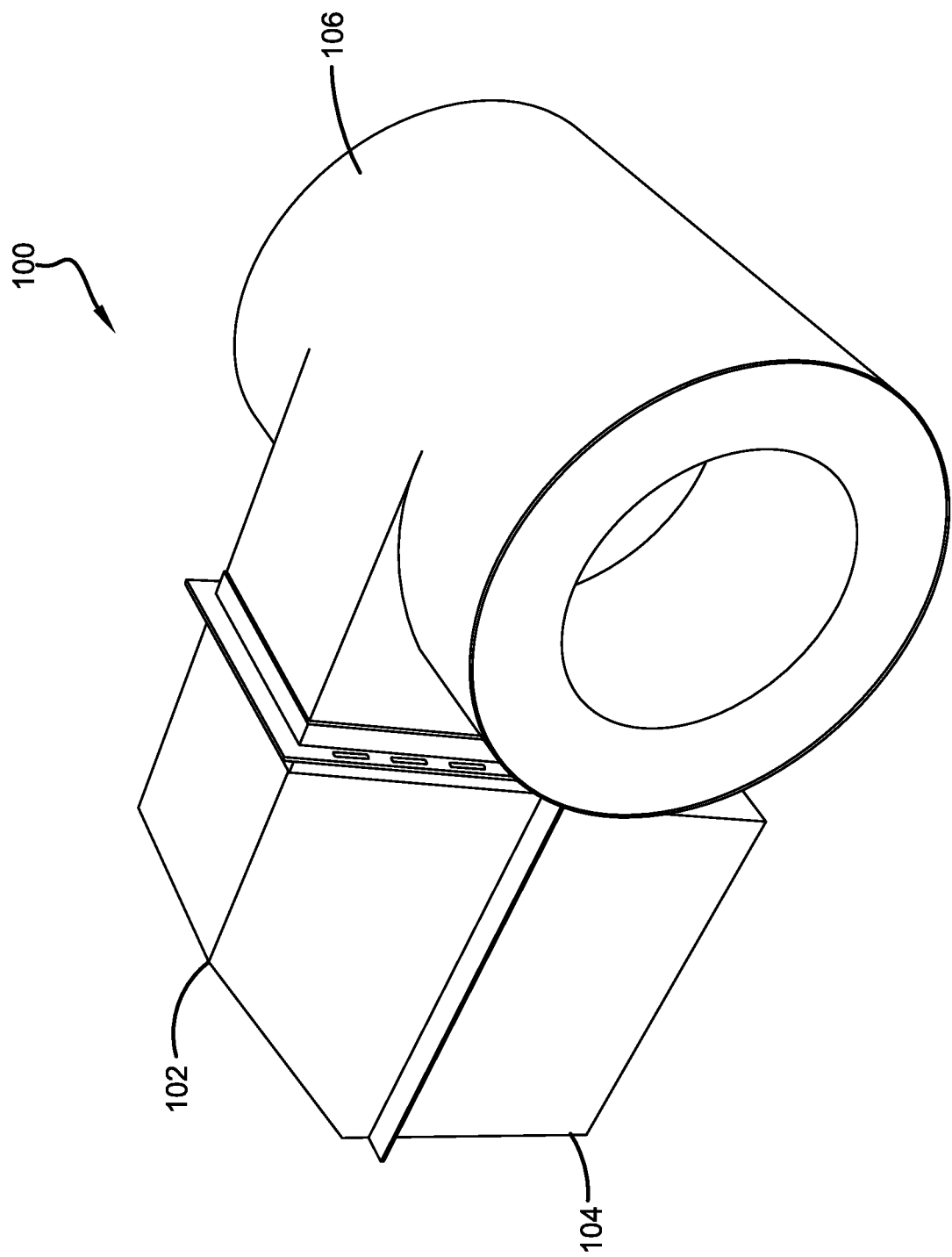
FIGS. 18 to 25 are perspective views of a portion of an illustrative exhaust system for a coke oven according to the present subject matter, in various stages of retrofitting the exhaust system.
Figure 19:
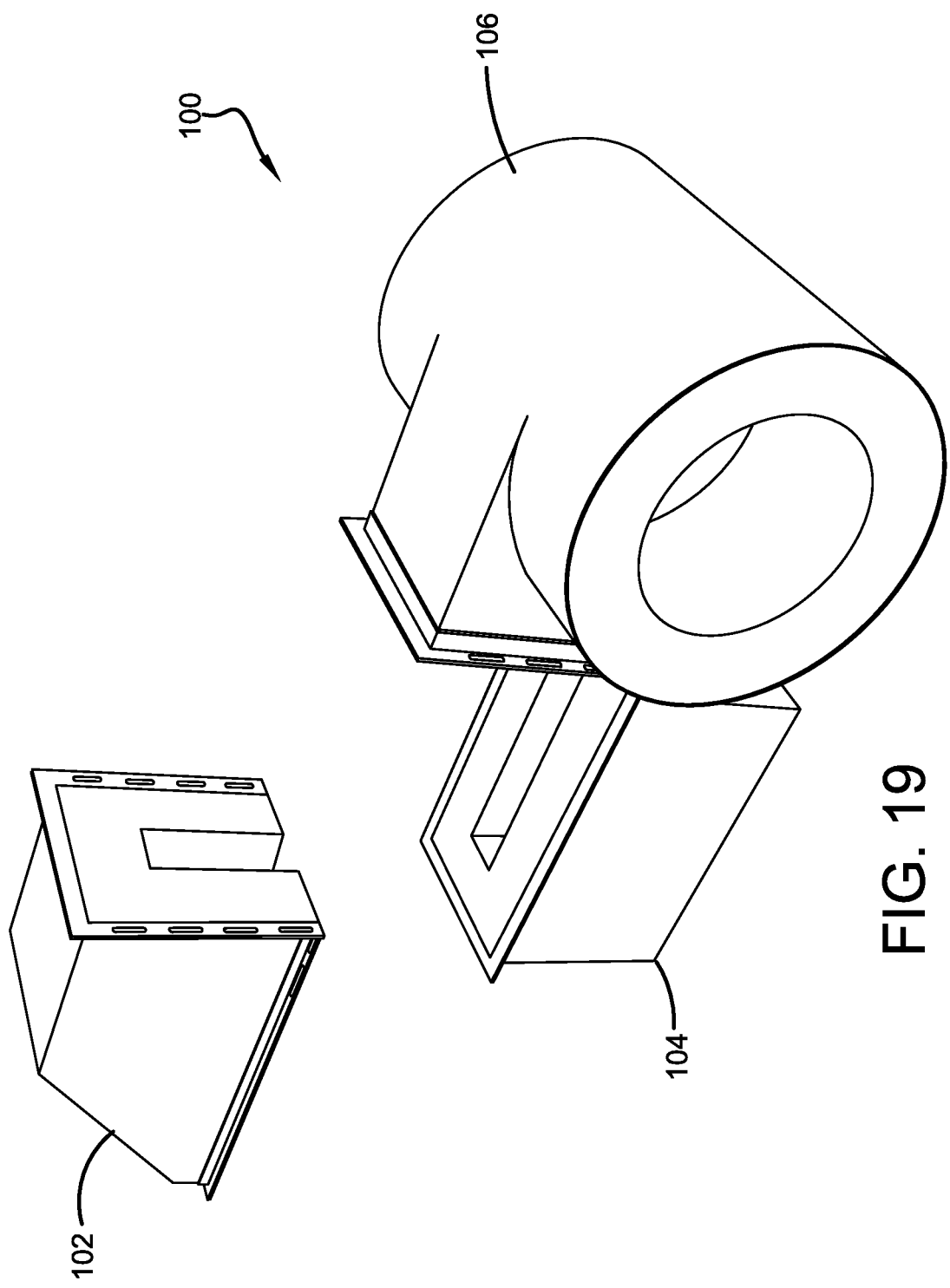
Figure 20:
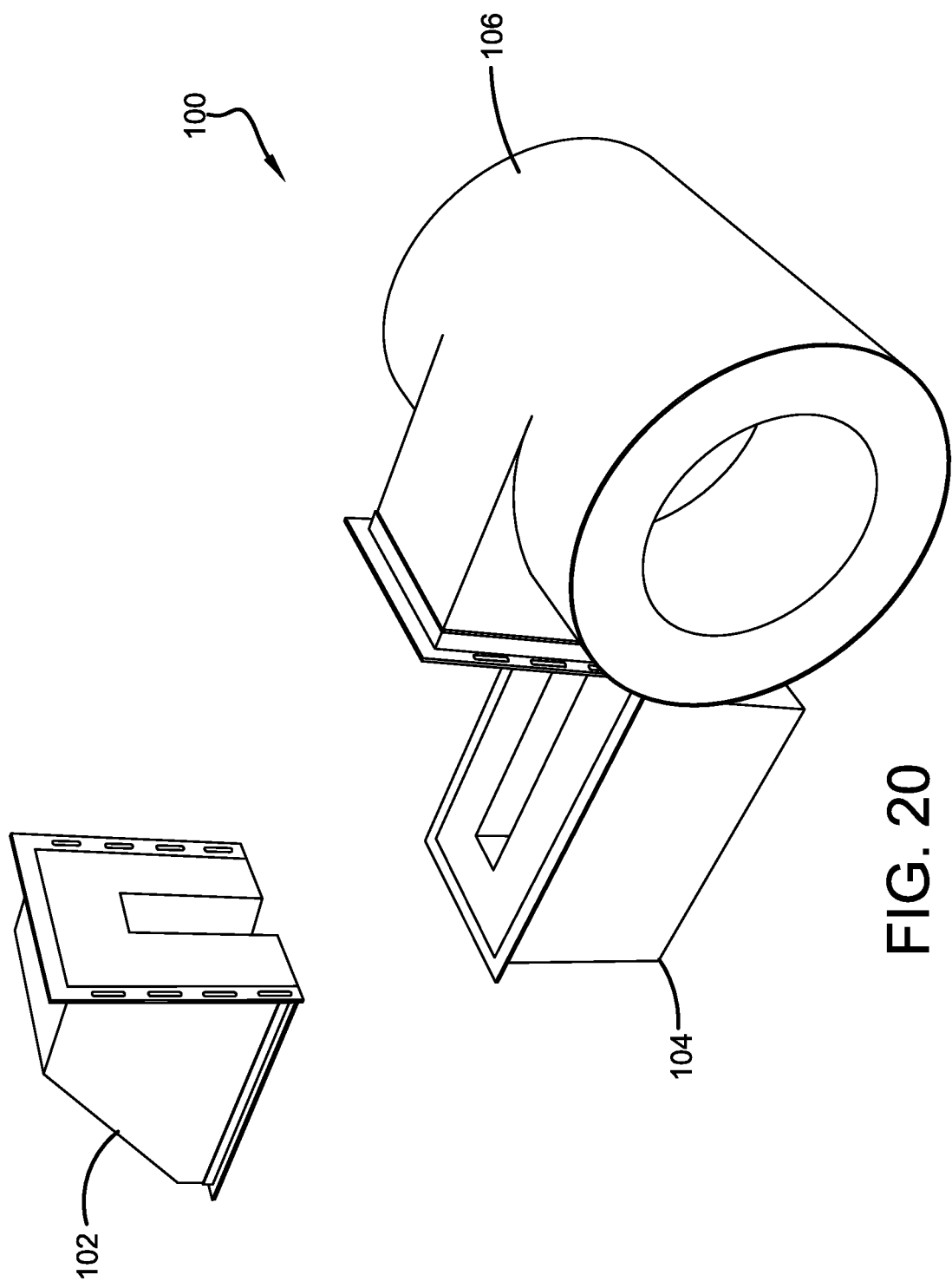
Figure 21:
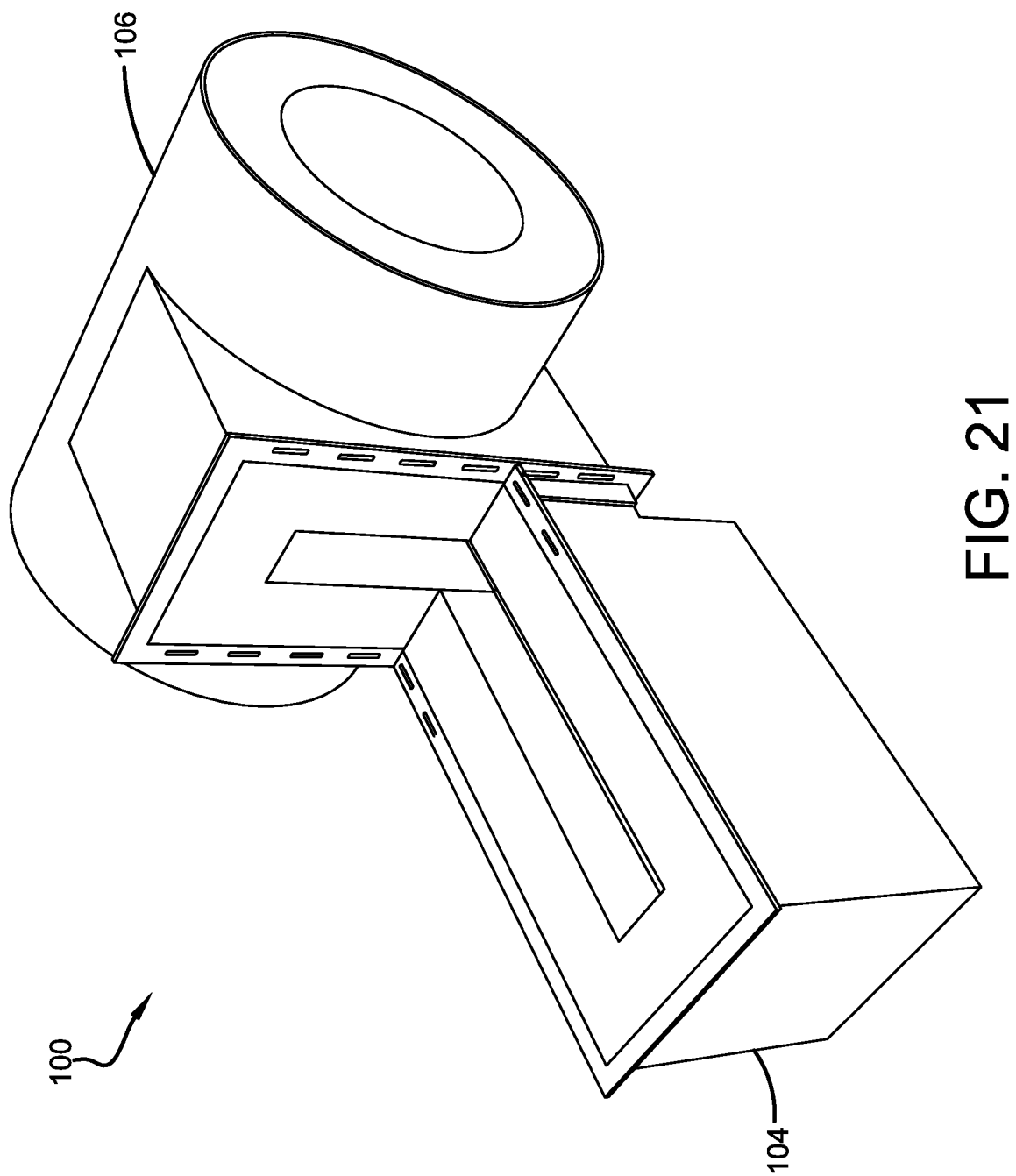
Figure 22:
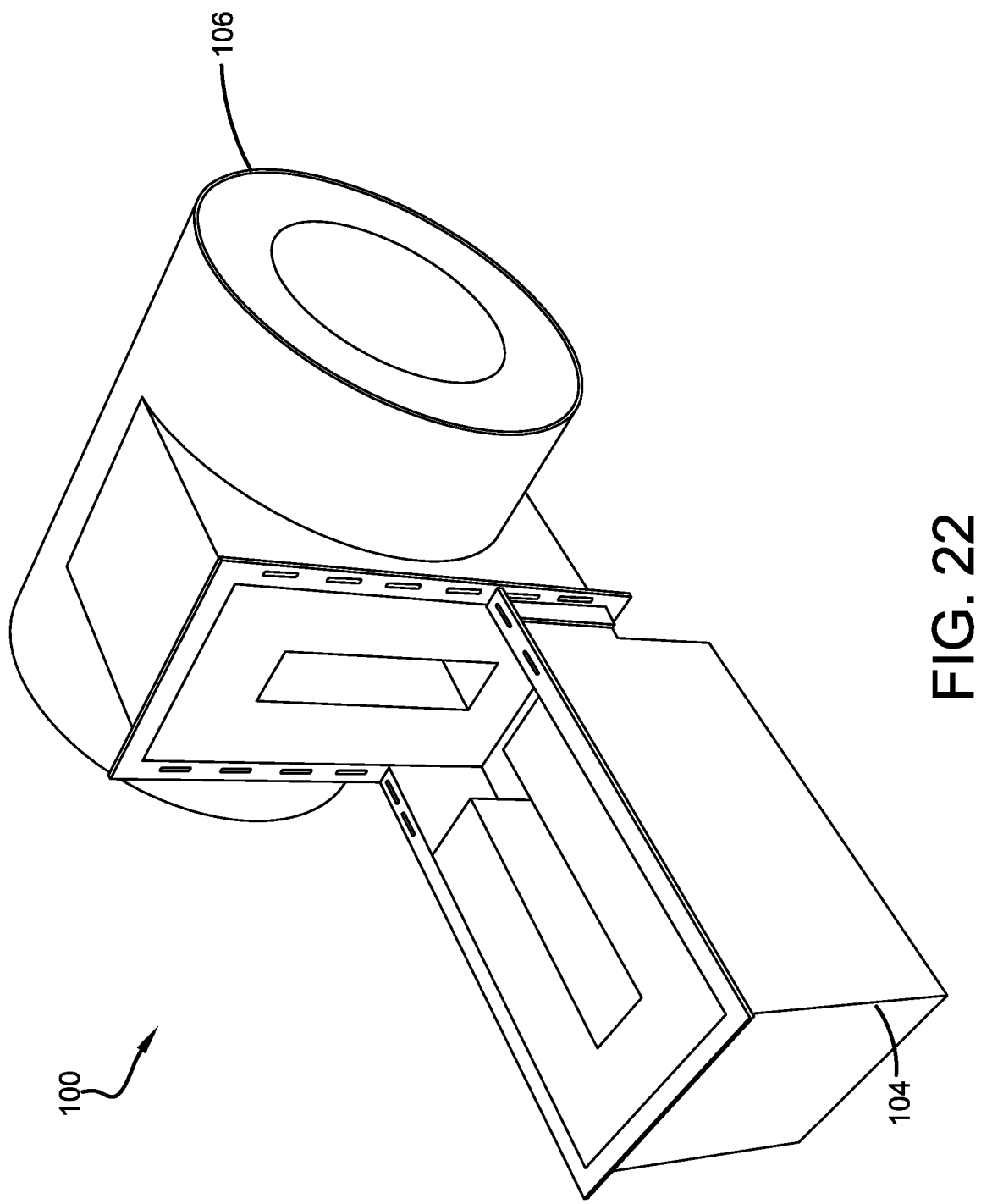
Figure 23:
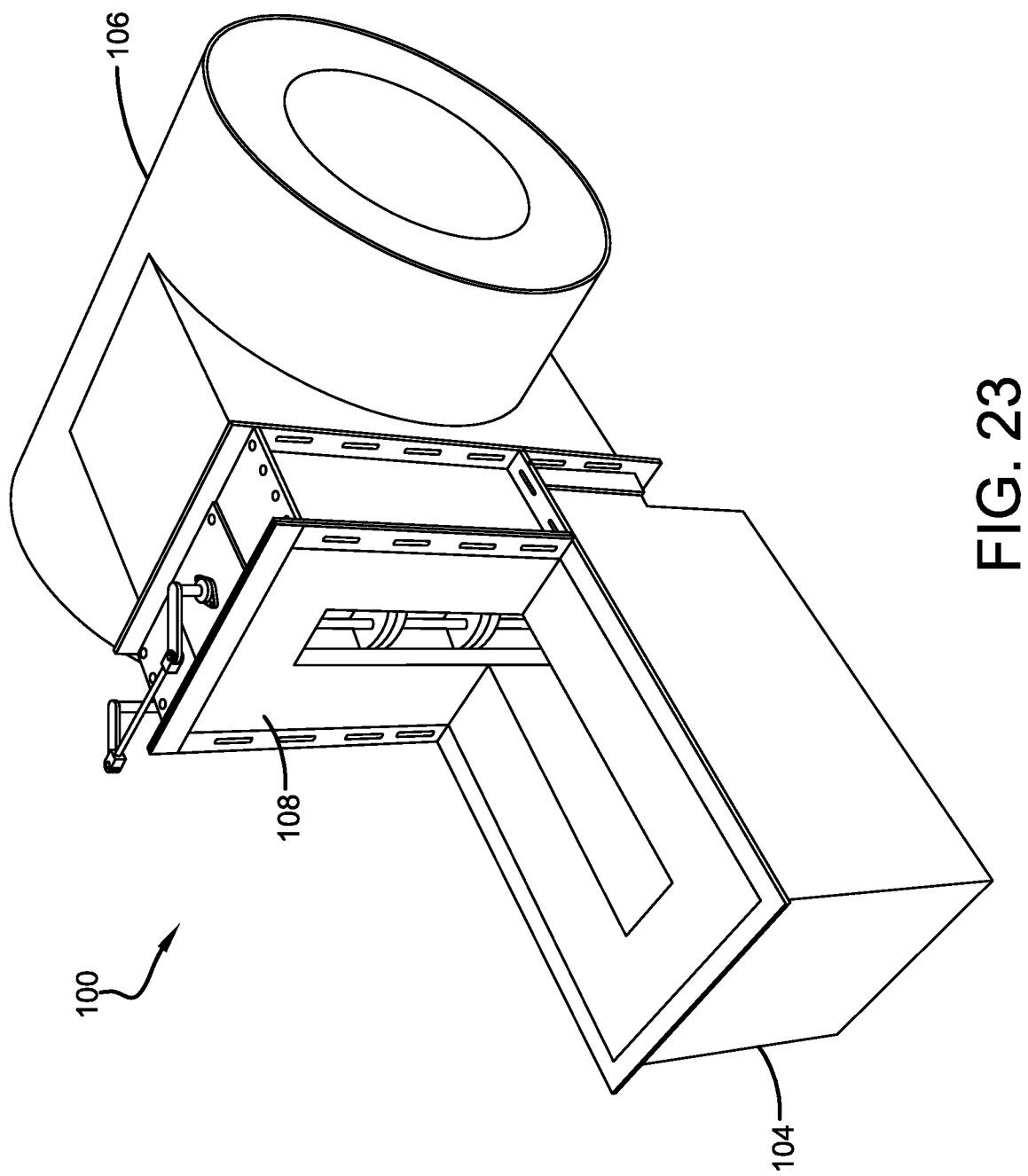
Figure 24:
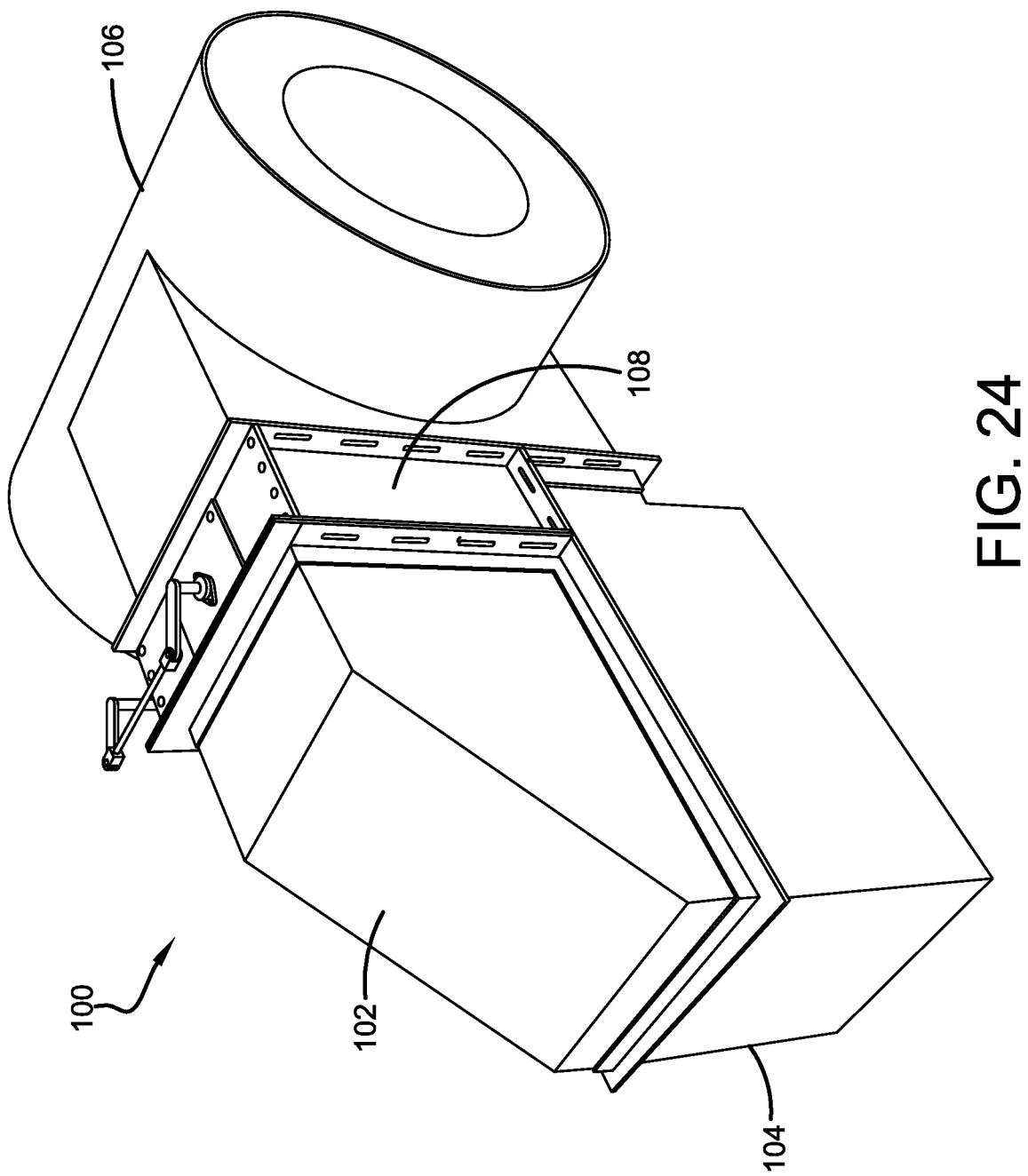
Figure 25:
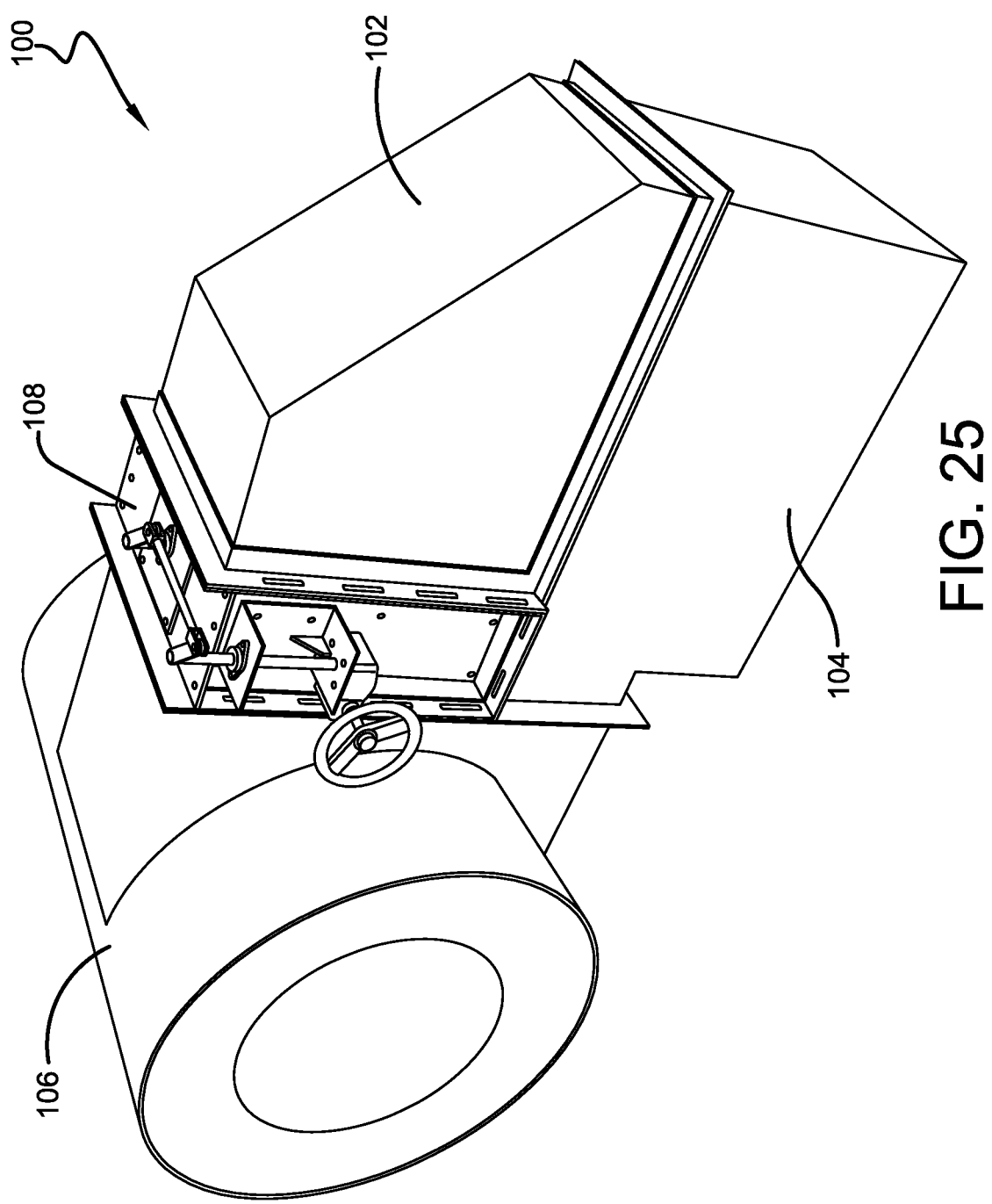

FIG. 18 shows a portion of an exhaust system 100 which may be retrofitted to include a valve as described herein. The exhaust system 100 includes an angled portion 102, a vertical portion 104 and a central duct 106, prior to retrofitting. FIG. 19 depicts how the angled portion 102 may be temporarily removed in order to begin the retrofitting process; the vertical portion 104 and the central duct 106 remain in place while the angled portion 102 is temporarily removed. FIG. 20 shows that the angled portion 102 may be shortened to remove a portion of the angled portion. FIG. 21 is a rotated view of the exhaust system 100 which. FIG. 22 shows that a portion of the vertical portion 104 may be removed. FIG. 23 shows that an illustrative valve 108 may be placed in the removed portion of vertical portion 104. FIG. 24 shows that the shortened angled portion 102 is replaced adjacent to the valve 108, such that the valve 108 occupies the removed portions of the angled portion 102 and the vertical portion 104. FIG. 25 shows a rotated view of the retrofitted exhaust system 100, with illustrative means for operating the valve.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A valve comprising:
   a housing;
   a rotating member comprising a closed first end and a second end opposite the closed first end positioned within the housing; and
   an actuator engaged with the closed first end of the rotating member;
   wherein the rotating member has a generally cylindrical form extending from the closed first end to the second end and a cavity extending through a portion of the generally cylindrical form in a direction generally perpendicular to an axis of the generally cylindrical form, the cavity forming an opening in a wall of the generally cylindrical form between the first end and the second end;
   wherein the rotating member is positioned within the housing such that, during operation of the valve, the actuator rotates the rotating member within the housing about the axis of the generally cylindrical form, and upon completion of about 90° of rotation of the rotating member about the axis, the cavity becomes aligned within the housing to change the valve from an open condition to a closed condition, or from a closed condition to an open condition;
   wherein the second end comprises an opening that is in fluid communication with the cavity and wherein the housing comprises an opening aligned with the opening of the second end;
   wherein, when in an open condition, the rotating member is configured to allow gas to flow through the opening of the second end, into the cavity, and out of the opening in the wall of the generally cylindrical form of the rotating member;
   and wherein the rotating member comprises inorganic fibers and a binder.

2. The valve of claim 1, wherein the rotating member further comprises a colloidal inorganic oxide; and
   wherein the inorganic fibers comprise at least one of low biopersistent fibers, refractory ceramic fibers, glass fibers, leached silica fibers, high alumina fibers, mullite fibers, rock wool fibers, slag wool fibers, alumina/silica fibers, magnesium aluminosilicate fibers, S-2 glass fibers, or E-glass fibers.

3. The valve of claim 2, wherein the colloidal inorganic oxide is present in the rotating member in an amount of from about 40 to about 80 percent by weight, based on the dry weight of the rotating member.

4. The valve of claim 1, wherein the binder comprises at least one of: (a) an inorganic binder, the inorganic binder comprising at least one of colloidal silica, colloidal alumina, colloidal zirconia or clay; or (b) an organic binder, the organic binder comprising at least one of polymer emulsions, solvent-based polymers or solvent-free polymers.

5. The valve of claim 1, wherein the inorganic fibers are present in the rotating member in an amount of from about 30 to about 90 percent by weight, based on the dry weight of the rotating member.

6. The valve of claim 1, wherein the binder is present in the rotating member in an amount of from about 20 to about 70 percent by weight, based on the dry weight of the rotating member.

7. The valve of claim 1, wherein the rotating member further comprises a coating material applied to at least a portion of an exterior surface of the rotating member.

8. The valve of claim 7, wherein the coating material comprises inorganic fibers and a binder.

9. An exhaust apparatus comprising the valve according to claim 1.

10. A coke oven system comprising the exhaust apparatus according to claim 9.

11. A method of retrofitting an exhaust system for a coke oven comprising:
    removing a portion of the exhaust system to accommodate the valve of claim 1; and
    placing the valve into the removed portion of the exhaust system to form a retrofitted exhaust system.

12. The valve of claim 1, wherein a portion of the gas flows through the rotating member in a direction generally parallel to the axis of the generally cylindrical form.

13. A method of manufacturing a rotating member for a valve comprising:
    preparing an aqueous slurry comprising inorganic fibers and a binder;
    contacting the aqueous slurry with a mold having a shape substantially similar to the shape of the rotating member;
    vacuum casting the slurry into and/or onto the mold to form a green shape; and
    drying the green shape to form a dried shape which forms the rotating member having a closed first end and a second end opposite the closed first end;
    wherein the rotating member has a generally cylindrical form extending from the closed first end to the second end and a cavity extending through a portion of the generally cylindrical form in a direction generally perpendicular to an axis of the generally cylindrical form, the cavity forming an opening in a wall of the generally cylindrical form between the first end and the second end
    wherein the second end comprises an opening that is in fluid communication with the cavity;
    wherein the rotating member is configured to allow gas to flow through the opening of the second end, into the cavity, and out of the opening in the wall of the generally cylindrical form of the rotating member;
    wherein the rotating member is configured to be positioned within a housing of the valve, the housing comprising an opening aligned with the opening of the second end, such that, during operation of the valve, an actuator rotates the rotating member within the housing about the axis of the generally cylindrical form, and upon completion of about 90° of rotation of the rotating member about the axis, the cavity becomes aligned within the housing to change the valve from an open condition to a closed condition, or from a closed condition to an open condition.

14. The method of claim 13, wherein, prior to said drying, the green shape is refined.

15. The method of claim 13, wherein after said drying, the dried shape is impregnated with colloidal silica.

16. The method of claim 13, wherein at least a portion of an exterior surface of the rotating member is coated with a coating material.

* * * * *